US011732192B2

(12) United States Patent
Matsuyama et al.

(10) Patent No.: US 11,732,192 B2
(45) Date of Patent: *Aug. 22, 2023

(54) LIQUID CRYSTAL COMPOSITION, LIGHT ABSORPTION ANISOTROPIC FILM, LAMINATE, AND IMAGE DISPLAY DEVICE

(71) Applicant: FUJIFILM Corporation, Tokyo (JP)

(72) Inventors: Hiroshi Matsuyama, Kanagawa (JP); Wataru Hoshino, Kanagawa (JP); Teruki Niori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 127 days.

This patent is subject to a terminal disclaimer.

(21) Appl. No.: 16/781,473

(22) Filed: Feb. 4, 2020

(65) Prior Publication Data

US 2020/0172810 A1   Jun. 4, 2020

Related U.S. Application Data

(63) Continuation of application No. PCT/JP2018/030375, filed on Aug. 15, 2018.

(30) Foreign Application Priority Data

Aug. 15, 2017 (JP) ................................. 2017-156878

(51) Int. Cl.
| | |
|---|---|
| *C09K 19/38* | (2006.01) |
| *C09K 19/20* | (2006.01) |
| *C09K 19/24* | (2006.01) |
| *C09K 19/32* | (2006.01) |
| *C09K 19/60* | (2006.01) |
| *G02F 1/1335* | (2006.01) |

(52) U.S. Cl.
CPC ...... *C09K 19/3833* (2013.01); *C09K 19/2007* (2013.01); *C09K 19/24* (2013.01); *C09K 19/32* (2013.01); *C09K 19/38* (2013.01); *C09K 19/3852* (2013.01); *C09K 19/60* (2013.01); *G02F 1/1335* (2013.01); *C09K 2019/2042* (2013.01); *C09K 2019/2078* (2013.01)

(58) Field of Classification Search
CPC ............... C09K 19/38; C09K 19/3833; C09K 19/3852; C09K 19/60; C09K 19/601; C09K 19/603; C09K 19/605; C09K 19/606; C09K 19/608

See application file for complete search history.

(56) References Cited

U.S. PATENT DOCUMENTS

| | | | | |
|---|---|---|---|---|
| 5,354,498 | A * | 10/1994 | Akashi | C09K 19/3842 252/299.01 |
| 10,927,260 | B2 * | 2/2021 | Hoshino | C08F 20/34 |
| 2005/0077498 | A1 | 4/2005 | Kato et al. | |
| 2009/0174844 | A1 * | 7/2009 | Li | C08K 5/34926 349/75 |
| 2013/0044286 | A1 * | 2/2013 | Yoon | G02B 5/3033 349/193 |
| 2014/0225047 | A1 * | 8/2014 | Ootsuki | C08F 20/68 349/193 |
| 2018/0346633 | A1 | 12/2018 | Hoshino et al. | |
| 2019/0185749 | A1 * | 6/2019 | Ootsuki | C07C 69/757 |
| 2019/0322937 | A1 | 10/2019 | Matsuyama et al. | |

FOREIGN PATENT DOCUMENTS

| | | | |
|---|---|---|---|
| JP | 8-231958 | A | 9/1996 |
| JP | 10-338879 | A | 12/1998 |
| JP | 11-101964 | A | 4/1999 |
| JP | 11101964 | A * | 4/1999 |
| JP | 2001-091737 | A | 4/2001 |
| JP | 2002-207118 | A | 7/2002 |
| JP | 2003-002927 | A | 1/2003 |
| JP | 2005-077665 | A | 3/2005 |
| JP | 2005-141206 | A | 6/2005 |
| JP | 2008-083394 | A | 4/2008 |
| JP | 2009-139486 | A | 6/2009 |
| JP | 2011-237513 | A | 11/2011 |
| JP | 2011237513 | A * | 11/2011 |
| WO | 03/062286 | A1 | 7/2003 |
| WO | 2017/154907 | A1 | 9/2017 |
| WO | 2018/124198 | A1 | 7/2018 |

OTHER PUBLICATIONS

English translation of JP2011237513. (Year: 2011).*
English translation of JP11101964. (Year: 1999).*
Office Action, issued by the Japanese Patent Office dated Oct. 6, 2020, in connection with corresponding Japanese Patent Application No. 2019-536786.
International Search Report issued in PCT/JP2018/030375 dated Nov. 13, 2018.
Written Opinion issued in PCT/JP2018/030375 dated Nov. 13, 2018.
International Preliminary Report on Patentability completed by WIPO dated Feb. 18, 2020 in connection with International Patent Application No. PCT/JP2018/030375.

* cited by examiner

*Primary Examiner* — Cynthia H Kelly
*Assistant Examiner* — Anna Malloy
(74) *Attorney, Agent, or Firm* — Edwards Neils LLC; Jean C. Edwards, Esq.

(57) ABSTRACT

A liquid crystal composition contains a side chain type polymer liquid crystalline compound which can form a light absorption anisotropic film having a high alignment degree and has excellent solubility in a general-purpose solvent, a light absorption anisotropic film obtained using the composition, a laminate, and an image display device. The composition includes: a side chain type polymer liquid crystalline compound; and a dichroic substance, in which the compound is a copolymer having a repeating unit (1) containing a mesogenic group with a molecular weight of greater than 280 and a repeating unit (2) with a molecular weight of 280 or less, a content of the repeating unit (2) is less than 14% by mass with respect to a total mass of the compound, and a content of the dichroic substance is greater than 2% by mass with respect to a total solid content of the composition.

20 Claims, No Drawings

LIQUID CRYSTAL COMPOSITION, LIGHT ABSORPTION ANISOTROPIC FILM, LAMINATE, AND IMAGE DISPLAY DEVICE

CROSS-REFERENCE TO RELATED APPLICATIONS

This application is a Continuation of PCT International Application No. PCT/JP2018/030375 filed on Aug. 15, 2018, which was published under Article 21(2) in Japanese, and which claims priority under 35 U.S.C. § 119(a) to Japanese Patent Application No. 2017-156878 filed on Aug. 15, 2017. The above applications are hereby expressly incorporated by reference, in their entirety, into the present application.

BACKGROUND OF THE INVENTION

1. Field of the Invention

The present invention relates to a liquid crystal composition, a light absorption anisotropic film, a laminate, and an image display device.

2. Description of the Related Art

In the past, devices which are operated by different principles for each function have been used in a case where an attenuation function, a polarization function, a scattering function, a shielding function, or the like is required in relation to irradiated light including laser light and natural light. Therefore, products corresponding to the above-described functions have been manufactured through different manufacturing processes for each function.

For example, in liquid crystal displays (LCDs), a linearly polarizing plate or a circularly polarizing plate is used to control optical activity and a birefringent property in display. In addition, in organic light emitting diodes (OLEDs), a circularly polarizing plate is used to prevent external light from being reflected.

Iodine has been widely used as a dichroic substance in these polarizing plates (polarizing elements). However, a polarizing element using an organic dye as a dichroic substance instead of iodine has also been examined.

For example, in JP2011-237513A, "a light absorption anisotropic film containing at least one kind of thermotropic liquid crystalline dichroic dye and at least one kind of thermotropic liquid crystalline polymer, in which the mass content of the thermotropic liquid crystalline dichroic dye in the light absorption anisotropic film is 30% or greater" is described (claim 1).

SUMMARY OF THE INVENTION

Polymer liquid crystalline compounds such as thermotropic liquid crystalline polymers are soluble in halogen solvents such as dichloromethane, chloroform and carbon tetrachloride, and high boiling point solvents such as N-methylpyrrolidone, N-ethylpyrrolidone and N,N-dimethylacetamide. However, the polymer liquid crystalline compounds have a problem in that it has low solubility in general-purpose solvents widely used in industrial processes, such as ketones, esters, ethers, and alcohols. Accordingly, from the viewpoint of safety, environmental protection, cost, and the like, there is a demand for a polymer liquid crystalline compound having excellent solubility in a general-purpose solvent.

The inventors have examined the light absorption anisotropic film described in JP2011-237513A, and found that depending on the kind of the polymer liquid crystalline compound used for forming the light absorption anisotropic film, the alignment degree of the light absorption anisotropic film may become insufficient with a reduction in the alignment degree of the dichroic substance or the solubility in a general-purpose solvent may be low, and there is room for improvement.

An object of the invention is to provide a liquid crystal composition containing a side chain type polymer liquid crystalline compound which can form a light absorption anisotropic film having a high alignment degree and has excellent solubility in a general-purpose solvent, a light absorption anisotropic film obtained using the liquid crystal composition, a laminate, and an image display device.

As a result of intensive studies on the above object, the present inventors have found that a side chain type polymer liquid crystalline compound containing a predetermined amount of a repeating unit (2) with a molecular weight of 280 or less has excellent solubility in a general-purpose solvent, and a light absorption anisotropic film having a high alignment degree can be formed by using a liquid crystal composition containing the side chain type polymer liquid crystalline compound and a predetermined amount of a dichroic substance. That is, the inventors have found that the object can be achieved with the following configuration.

[1] A liquid crystal composition including a side chain type polymer liquid crystalline compound and a dichroic substance, wherein the side chain type polymer liquid crystalline compound is a copolymer having a repeating unit (1) containing a mesogenic group with a molecular weight of greater than 280 and a repeating unit (2) with a molecular weight of 280 or less, a content of the repeating unit (2) is less than 14% by mass with respect to a total mass of the side chain type polymer liquid crystalline compound, and a content of the dichroic substance is greater than 2% by mass with respect to a total solid content of the liquid crystal composition.

[2] The liquid crystal composition according to [1], in which the repeating unit (1) is represented by Formula (1).

In Formula (1), P1 represents a main chain of the repeating unit, L represents a single bond or a divalent linking group, SP1 represents a single bond or a spacer group, M1 represents a mesogenic group, and T1 represents a terminal group.

[3] The liquid crystal composition according to [1] or [2], in which the content of the dichroic substance is 4% by mass or greater with respect to the total solid content of the liquid crystal composition.

[4] The liquid crystal composition according to any one of [1] to [3], in which the content of the dichroic substance is 10% by mass or greater with respect to the total solid content of the liquid crystal composition.

[5] The liquid crystal composition according to any one of [1] to [4], in which a molecular weight of the repeating unit (2) is 180 or less.

[6] The liquid crystal composition according to any one of [1] to [5], in which the content of the repeating unit (2) is 2% to 7% by mass with respect to the total mass of the side chain type polymer liquid crystalline compound.

[7] The liquid crystal composition according to any one of [1] to [6], in which the repeating unit (2) contains no mesogenic group.

[8] A light absorption anisotropic film which is formed using the liquid crystal composition according to any one of [1] to [7].

[9] A laminate comprising: a base material; and the light absorption anisotropic film according to [8] which is provided on the base material.

[10] The laminate according to [9], further including: a λ/4 plate which is provided on the light absorption anisotropic film.

[11] An image display device including: the light absorption anisotropic film according to [8]; or the laminate according to [9] or [10].

As described below, according to the invention, it is possible to provide a liquid crystal composition containing a side chain type polymer liquid crystalline compound which can form a light absorption anisotropic film having a high alignment degree and has excellent solubility in a general-purpose solvent, a light absorption anisotropic film obtained using the liquid crystal composition, a laminate, and an image display device.

DESCRIPTION OF THE PREFERRED EMBODIMENTS

The following description of constituent requirements is based on typical embodiments of the invention, but the invention is not limited thereto.

In this specification, a numerical value range expressed using "to" means a range including numerical values before and after "to" as a lower limit value and an upper limit value.

In this specification, the term (meth)acrylic acid is a generic term for "acrylic acid" and "methacrylic acid", and the term (meth)acryloyl is a generic term for "acryloyl" and "methacryloyl".

[Liquid Crystal Composition]

A liquid crystal composition according to the embodiment of the invention includes a side chain type polymer liquid crystalline compound and a dichroic substance. The side chain type polymer liquid crystalline compound is a copolymer having a repeating unit (1) containing a mesogenic group with a molecular weight of greater than 280 and a repeating unit (2) with a molecular weight of 280 or less, a content of the repeating unit (2) is less than 14% by mass with respect to a total mass of the side chain type polymer liquid crystalline compound, and a content of the dichroic substance is greater than 2% by mass with respect to a total solid content of the liquid crystal composition.

The side chain type polymer liquid crystalline compound contained in the liquid crystal composition according to the embodiment of the invention has excellent solubility in a general-purpose solvent. This is presumably because, since the side chain type polymer liquid crystalline compound has the repeating unit (2) with a small molecular weight, a solvent easily enters the side chain type polymer liquid crystalline compound.

In addition, according to the liquid crystal composition according to the embodiment of the invention, a light absorption anisotropic film having a high alignment degree can be formed. This is presumably because, since the repeating unit (2) has a small molecular weight, the alignment of the repeating unit (1) containing a mesogenic group is not easily disturbed by the repeating unit (2) which is a copolymerization component with the repeating unit (1).

Here, the side chain type polymer liquid crystalline compound having excellent solubility in a solvent is easily compatible with the dichroic substance in the liquid crystal composition. Therefore, the crystallinity of the dichroic substance is lowered, and as a result, the alignment degree of the light absorption anisotropic film may be lowered. Regarding this problem, the present inventors have found that even in a case where a side chain type polymer liquid crystalline compound having excellent solubility in a solvent is used, a decrease in the alignment degree of the light absorption anisotropic film can be suppressed by using a liquid crystal composition containing a predetermined amount or more of a dichroic substance.

[Side Chain Type Polymer Liquid Crystalline Compound]

The side chain type polymer liquid crystalline compound according to the embodiment of the invention is a copolymer having a repeating unit (1) containing a mesogenic group with a molecular weight of greater than 280 and a repeating unit (2) with a molecular weight of 280 or less. The side chain type polymer liquid crystalline compound may be any polymer such as a block polymer, an alternating polymer, a random polymer, or a graft polymer.

Here, the side chain type polymer liquid crystalline compound means a polymer liquid crystalline compound having a liquid crystal structure in a side chain. Hereinafter, the side chain type polymer liquid crystalline compound may be abbreviated as "polymer liquid crystalline compound".

<Repeating Unit (1)>

Since the polymer liquid crystalline compound has the repeating unit (1) exhibiting liquid crystallinity, aggregation and crystallization of components contained in the liquid crystal composition, and cissing in a case where a coating film is formed are suppressed, and thus alignment maturation by overheating uniformly progresses.

The repeating unit (1) is a repeating unit containing a mesogenic group with a molecular weight of greater than 280.

In the invention, the mesogenic group is a group showing a main skeleton of liquid crystal molecules contributing to the formation of liquid crystal. Details thereof are as described in association with M1 in the repeating unit (1) to be described later, and specific examples thereof are also the same as those given in the case of M1.

The molecular weight of the repeating unit (1) does not mean a molecular weight of a monomer (hereinafter, also referred to as "liquid crystalline monomer") containing a mesogenic group which is used to obtain the repeating unit (1), but means a molecular weight of the repeating unit (1) put in a state of being incorporated into the polymer liquid crystalline compound by polymerization of the liquid crystalline monomer.

The molecular weight of the repeating unit (1) is greater than 280, preferably 350 or greater, and more preferably 400 or greater. The lower limit value of the molecular weight of the repeating unit (1) is usually 2,000 or less, and preferably 1,500 or less.

The repeating unit (1) is not particularly limited as long as it is a repeating unit with a molecular weight of greater than 280 and has a mesogenic group in a side chain, and a repeating unit represented by Formula (1) is preferable from the viewpoint that the alignment degree of a light absorption anisotropic film is further improved.

(1)

In Formula (1), P1 represents a main chain of the repeating unit, L1 represents a single bond or a divalent linking group, SP1 represents a single bond or a spacer group, M1 represents a mesogenic group, and T1 represents a terminal group.

Specific examples of the main chain of the repeating unit represented by P1 include groups represented by Formulae (P1-A) to (P1-D). Among these, groups represented by Formula (P1-A) are preferable from the viewpoint of diversity of monomers as raw materials and ease of handling.

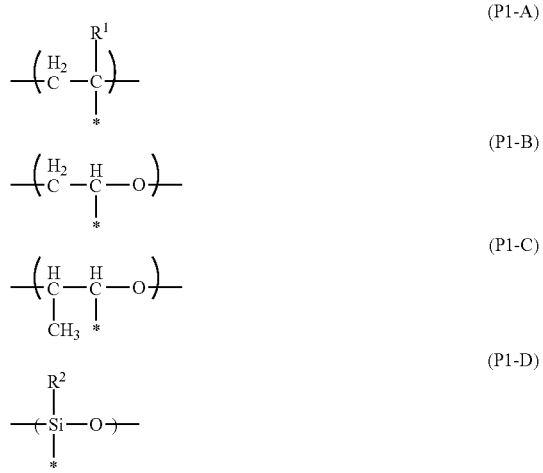

In Formulae (P1-A) to (P1-D), "*" represents a bonding position to L1 in Formula (1). In formula (P1-A), $R^1$ represents a hydrogen atom or a methyl group. In Formula (P1-D), $R^2$ represents an alkyl group.

The group represented by Formula (P1-A) is preferably a unit of a partial structure of a poly(meth)acrylic acid ester obtained by polymerizing a (meth)acrylic acid ester.

The group represented by Formula (P1-B) is preferably an ethylene glycol unit in polyethylene glycol obtained by polymerizing ethylene glycol.

The group represented by Formula (P1-C) is preferably a propylene glycol unit obtained by polymerizing propylene glycol.

The group represented by Formula (P1-D) is preferably a siloxane unit of polysiloxane obtained by polycondensing silanol. Here, the silanol is a compound represented by Formula $Si(R^2)_3(OH)$. In the formula, a plurality of $R^2$'s each independently represent a hydrogen atom or an alkyl group. At least one of the plurality of $R^2$'s represents an alkyl group.

L1 is a single bond or a divalent linking group.

Examples of the divalent linking group represented by L1 include —C(O)O—, —OC(O)—, —O—, —S—, —C(O)$NR^3$—, —$NR^3C(O)$—, —$S(O)_2$—, and —$NR^3R^4$—. In the formula, $R^3$ and $R^4$ each independently represent a hydrogen atom or an alkyl group having 1 to 6 carbon atoms which may have a substituent (for example, a substituent W to be described later). In the specific examples of the divalent linking group, a left bonding hand is bonded to P1, and a right bonding hand is bonded to SP1.

In a case where P1 is a group represented by Formula (P1-A), L1 is preferably a group represented by —C(O)O—.

In a case where P1 is a group represented by any one of Formula (P1-B), (P1-C), or (P1-D), L1 is preferably a single bond.

SP1 is a single bond or a spacer group.

The spacer group represented by SP1 is preferably a group including at least one selected from the group consisting of an oxyethylene structure, an oxypropylene structure, a polysiloxane structure, and a fluorinated alkylene structure, or a linear or branched alkylene group having 2 to 20 carbon atoms. The alkylene group may contain —O—, —O—CO—, —CO—O—, or —O—CO—O—.

The spacer group represented by SP1 is more preferably a group including at least one selected from the group consisting of an oxyethylene structure, an oxypropylene structure, a polysiloxane structure, and a fluorinated alkylene structure from the viewpoint of easy exhibition of liquid crystallinity, raw material availability, and the like. Here, the oxyethylene structure represented by SP1 is preferably a group represented by *—$(CH_2—CH_2O)_{n1}$—*. In the formula, n1 represents an integer of 1 to 20, and * represents a bonding position to L1 or M1.

The oxypropylene structure represented by SP1 is preferably a group represented by *—$(CH(CH_3)—CH_2O)_{n2}$—*. In the formula, n2 represents an integer of 1 to 3, and * represents a bonding position to L1 or M1.

The polysiloxane structure represented by SP1 is preferably a group represented by *—$(Si(CH_3)_2—O)_{n3}$—*. In the formula, n3 represents an integer of 6 to 10, and * represents a bonding position to L1 or M1.

The fluorinated alkylene structure represented by SP1 is preferably a group represented by *—$(CF_2—CF_2)_{n4}$—*. In the formula, n4 represents an integer of 6 to 10, and * represents a bonding position to L1 or M1.

The mesogenic group represented by M1 is a group showing the main skeleton of liquid crystal molecules contributing to the formation of liquid crystal. The liquid crystal molecules exhibit liquid crystallinity in an intermediate state (mesophase) between a crystalline state and an isotropic liquid state. The mesogenic group is not particularly limited, and for example, the description on pages 7 to 16 of "Flussige Kristalle in Tabellen II" (VEB Deutsche Verlag fur Grundstoff Industrie, Leipzig, 1984) and the description in Chapter 3 of Liquid Crystal Handbook (Maruzen, 2000) edited by Liquid Crystal Handbook Editing Committee can be referred to.

The mesogenic group is preferably a group having at least one cyclic structure selected from the group consisting of an aromatic hydrocarbon group, a heterocyclic group, and an alicyclic group.

The mesogenic group is preferably a group represented by Formula (M1-A) or (M1-B) from the viewpoint of exhibition of liquid crystallinity, adjustment of a liquid crystal phase transition temperature, raw material availability, and synthesis suitability.

In Formula (M1-A), A1 is a divalent group selected from the group consisting of an aromatic hydrocarbon group, a heterocyclic group, and an alicyclic group. These groups may be substituted by a substituent such as an alkyl group, a fluorinated alkyl group, an alkoxy group, or a substituent W to be described later.

The divalent group represented by A1 is preferably a 4- to 6-membered ring. The divalent group represented by A1 may be monocyclic or condensed.

* represents a bonding position to SP1 or T1.

Examples of the divalent aromatic hydrocarbon group represented by A1 include a phenylene group, a naphthylene group, a fluorene-diyl group, an anthracene-diyl group, and a tetracene-diyl group, and from the viewpoint of diversity of the design of a mesogenic skeleton and raw material availability, a phenylene group or a naphthylene group is preferable, and a phenylene group is more preferable.

The divalent heterocyclic group represented by A1 may be aromatic or non-aromatic, and is preferably a divalent aromatic heterocyclic group from the viewpoint of a further improvement in the alignment degree.

Examples of the atoms other than the carbon atom of the divalent aromatic heterocyclic group include a nitrogen atom, a sulfur atom, and an oxygen atom. In a case where the aromatic heterocyclic group has a plurality of ring-constituting atoms other than the carbon atom, these may be the same or different.

Specific examples of the divalent aromatic heterocyclic group include a pyridylene group (pyridine-diyl group), a pyridazine-diyl group, an imidazole-diyl group, a thienylene (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimide-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 is 2 or greater, a plurality of A1's may be the same or different.

In Formula (M1-B), A2 and A3 each independently represent a divalent group selected from the group consisting of an aromatic hydrocarbon group, a heterocyclic group, and an alicyclic group. Since specific examples and preferable aspects of A2 and A3 are the same as those of A1 of Formula (M1-A), the description thereof will be omitted.

In Formula (M1-B), a2 represents an integer of 1 to 10. In a case where a2 is 2 or greater, a plurality of A2's may be the same or different, a plurality of A3's may be the same or different, and a plurality of LA1's may be the same or different.

In Formula (M1-B), in a case where a2 is 1, LA1 is a divalent linking group. In a case where a2 is 2 or greater, a plurality of LA1's each independently represent a single bond or a divalent linking group, and at least one of the plurality of LA1's is a divalent linking group.

Examples of the divalent linking group represented by LA1 in Formula (M1-B) include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)C(Z')—C(O)—S—, —S—C(O)—C(Z)=C(Z')—, —C(Z)=N—N=C(Z')— (Z,Z',Z" each independently represent hydrogen, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. LA1 may be a group formed by combining two or more of the above groups.

Specific examples of M1 include the following structures. In the following specific examples, "Ac" represents an acetyl group.

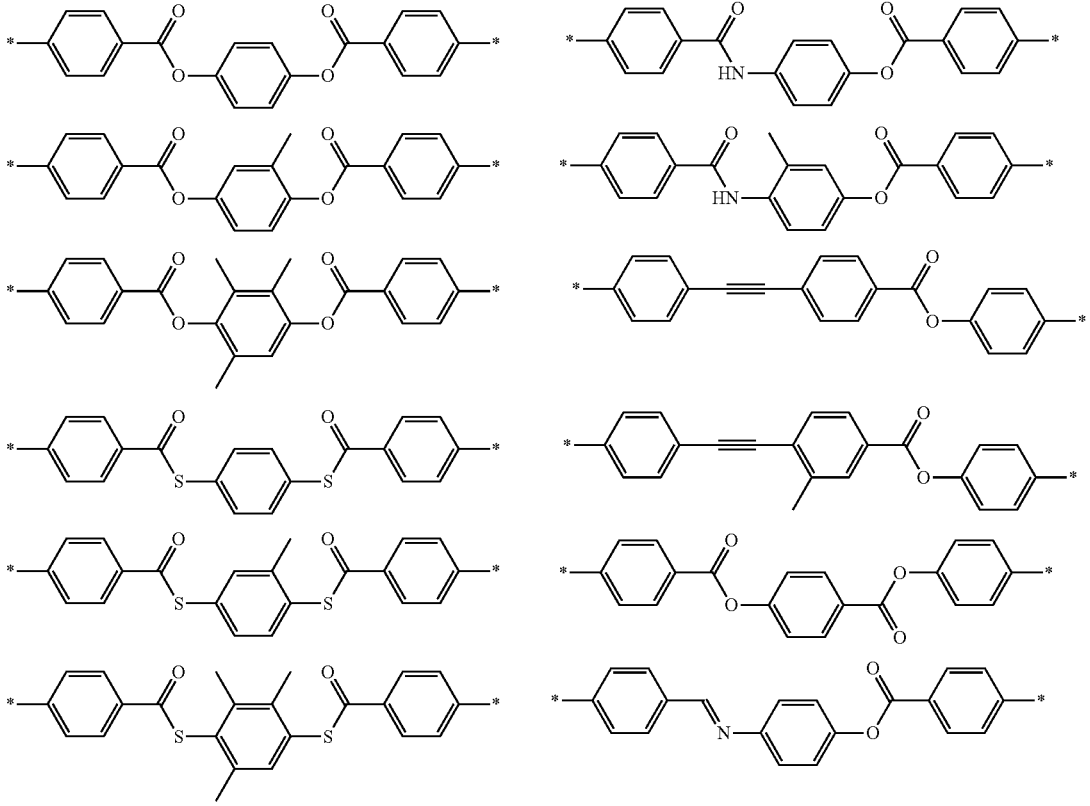

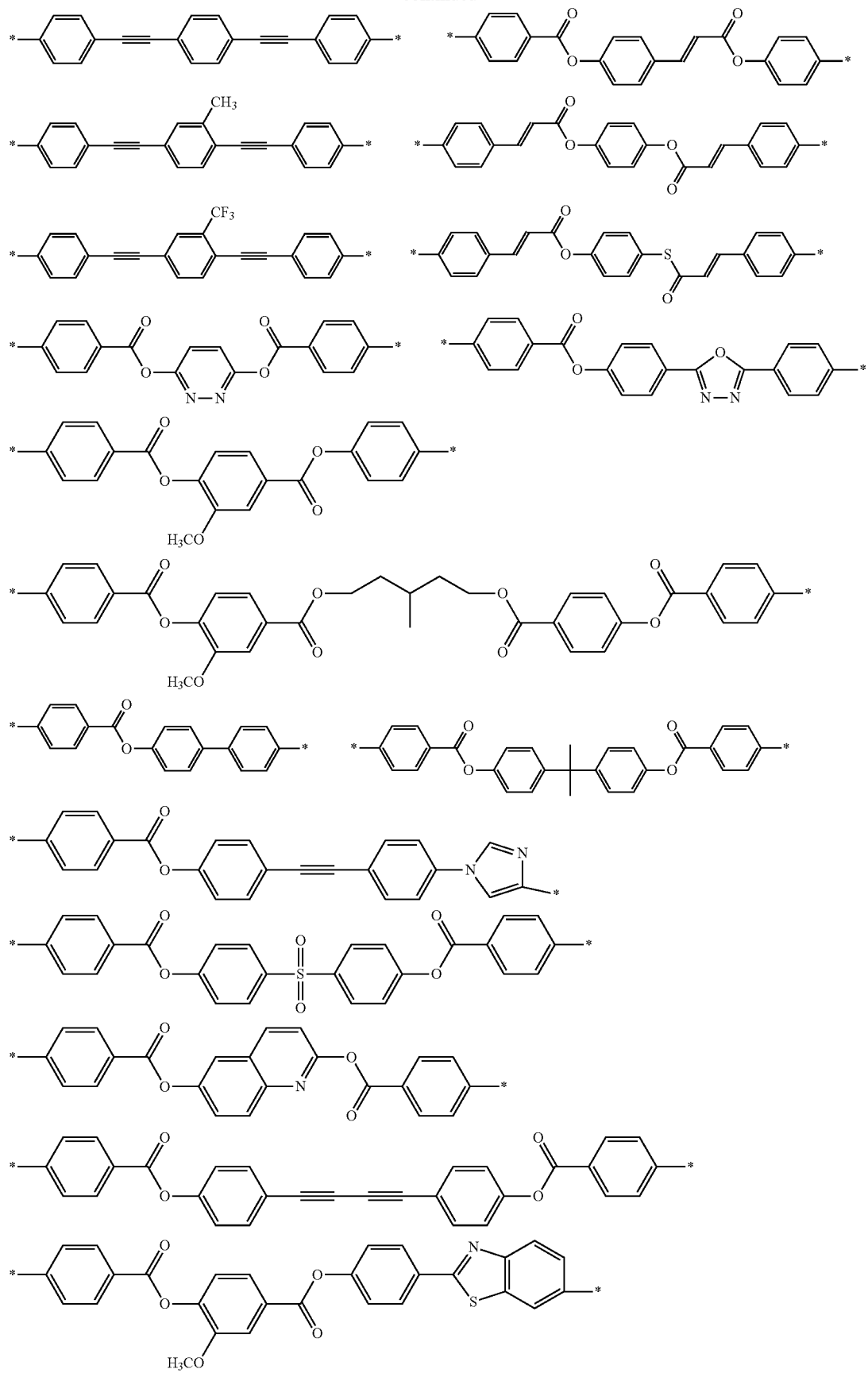

-continued
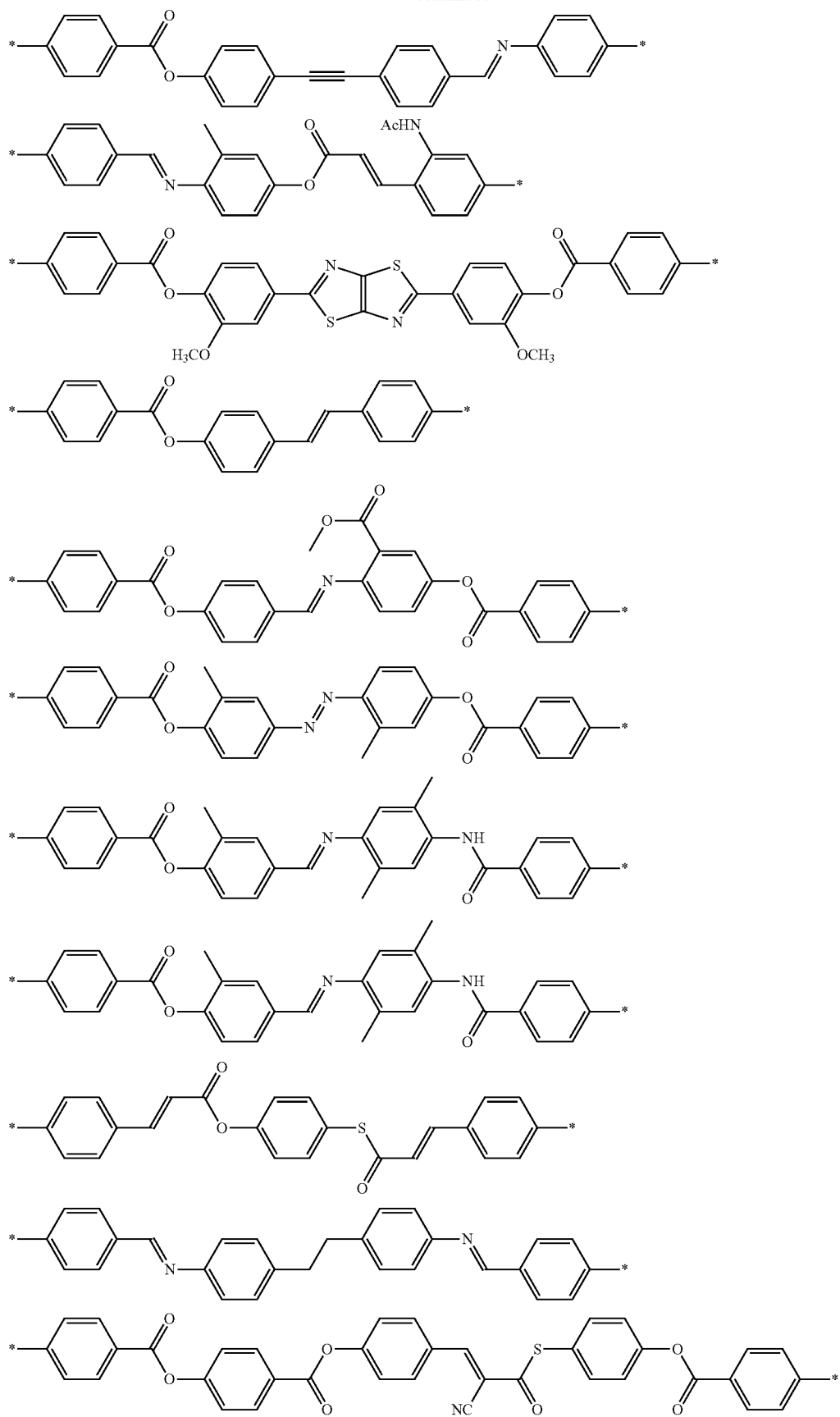

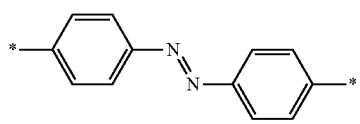
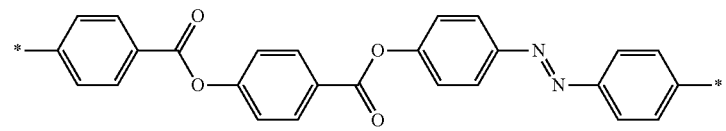

-continued

Examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an oxycarbonyl group having 1 to 10 carbon atoms, an acyloxy group having 1 to 10 carbon atoms, an acylamino group having 1 to 10 carbon atoms, an alkoxycarbonyl group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, and a ureido group having 1 to 10 carbon atoms. These terminal groups may be further substituted by the above groups or the polymerizable groups described in JP2010-244038A.

The number of atoms in the main chain of T1 is preferably 1 to 20, more preferably 1 to 15, even more preferably 1 to 10, and particularly preferably 1 to 7. In a case where the number of atoms in the main chain of T1 is 20 or less, the alignment degree of a light absorption anisotropic film is further improved. Here, the "main chain" of T1 means the longest molecular chain bonded to M1, and hydrogen atoms are not counted as the number of atoms in the main chain of T1. For example, in a case where T1 is an n-butyl group, the main chain has 4 atoms, and in a case where T1 is a sec-butyl group, the main chain has 3 atoms.

The content of the repeating unit (1) is preferably greater than 86% by mass, more preferably 93% by mass or greater, and even more preferably 95% by mass or greater with respect to a total mass (100% by mass) of the polymer liquid crystalline compound. The upper limit value of the content of the repeating unit (1) is preferably 98% by mass or less. In a case where the content of the repeating unit (1) is greater than 86% by mass, the alignment degree of a light absorption anisotropic film is further improved. In a case where the content of the repeating unit (1) is 98% by mass or less, the solubility of the polymer liquid crystalline compound is further improved.

In the invention, the content of each repeating unit contained in the polymer liquid crystalline compound is calculated based on a molar ratio of each repeating unit in the polymer measured using a nuclear magnetic resonance (NMR) analyzer.

The polymer liquid crystalline compound may contain only one kind of repeating unit (1) or two or more kinds of repeating units (1). Containing two or more kinds of repeating units (1) in the polymer liquid crystalline compound is advantageous in that the solubility of the polymer liquid crystalline compound in a solvent is improved and the liquid crystal phase transition temperature is easily adjusted. In a case where two or more kinds of repeating units (1) are contained, the total amount thereof is preferably within the above range.

In a case where two or more kinds of repeating units (1) are contained, a repeating unit (1) in which T1 does not include a polymerizable group and a repeating unit (1) in which T1 includes a polymerizable group may be used in combination. This further improves the curability of a light absorption anisotropic film.

In this case, in the polymer liquid crystalline compound, a ratio of the repeating unit (1) in which T1 includes a polymerizable group to the repeating unit (1) in which T1 does not include a polymerizable group (repeating unit (1) in which T1 includes polymerizable group/repeating unit (1) in which T1 does not include polymerizable group) is preferably 0.005 to 4, and more preferably 0.01 to 2.4 in terms of mass ratio. In a case where the mass ratio is 4 or less, there is an advantage in that an excellent alignment degree is obtained. In a case where the mass ratio is 0.05 or greater, the curability of a light absorption anisotropic film is further improved.

(log P Value) In Formula (1), the difference ($|\log P_1 - \log P_2|$) between the log P value of P1, L1, and SP1 (hereinafter, also referred to as "log $P_1$") and the log P value of M1 (hereinafter, also referred to as "log $P_2$") is preferably 4 or greater, more preferably 4.25 or greater, and particularly preferably 4.5 or greater.

The log P value is an index indicating the hydrophilic property and the hydrophobic property of a chemical structure. In the repeating unit represented by Formula (1), in a case where the difference between the log P value of P1 (hereinafter, also referred to as "main chain"), L1, and SP1 (hereinafter, also referred to as "spacer group") and the log P value of M1 (hereinafter, also referred to as "mesogenic group") is equal to or greater than a predetermined value, the compatibility between the structure from the main chain to the spacer group and the mesogenic group is low. As a result, it is presumed that the crystallinity of the polymer liquid crystalline compound increases, and thus the alignment degree of the polymer liquid crystalline compound becomes high. As described above, in a case where the polymer liquid crystalline compound has a high alignment degree, it is presumed that the compatibility between the polymer liquid crystalline compound and the dichroic substance is lowered (that is, the crystallinity of the dichroic substance is improved), and thus the alignment degree of the dichroic substance is improved. As a result, the alignment degree of a light absorption anisotropic film to be obtained is further increased.

The upper limit value of the difference ($|\log P_1 - \log P_2|$) described above is preferably 15 or less, more preferably 12 or less, and even more preferably 10 or less from the viewpoint of adjustment of a liquid crystal phase transition temperature and synthesis suitability. Here, the log P value is an index indicating the hydrophilic property and the hydrophobic property of a chemical structure, and may be referred to as the hydrophilic-hydrophobic parameter. The log P value can be calculated using software such as ChemBioDraw Ultra or HSPiP (Ver. 4.1.07). In addition, the log P value can be obtained experimentally by the method in OECD Guidelines for the Testing of Chemicals, Sections 1, Test No. 117, etc. In the invention, the value calculated by inputting a structural formula of a compound to HSPiP (Ver. 4.1.07) is employed as a log P value unless otherwise noted.

log $P_1$ described above means the log P value of P1, L1, and SP1. The "log P value of P1, L1, and SP1" means a log P value of a structure in which P1, L1, and SP1 are integrated, not a sum of the respective log P values of P1, L1 and SP1. Specifically, log $P_1$ is calculated by inputting a set of structural formulae from P1 to SP in Formula (1) to the software.

In calculating log $P_1$, regarding the group moiety represented by P1 in the set of structural formulae from P1 to SP1, the structure of the group represented by P1 itself (for example, Formulae (P1-A) to (P1-D) described above) may be used, or the structure of a group capable of becoming P1 after polymerization of a monomer used for obtaining the repeating unit represented by Formula (1) may be used.

Here, specific examples of the latter (group capable of becoming P1) are as follows. The group is a group represented by $CH_2$=C($R^1$)— ($R^1$ represents a hydrogen atom or a methyl group) in a case where P1 is obtained by polymerizing a (meth)acrylic acid ester. In addition, in a case where P1 is obtained by polymerizing ethylene glycol, the group is ethylene glycol, and in a case where P1 is obtained by polymerizing propylene glycol, the group is propylene glycol. In addition, in a case where P1 is obtained by polycondensing silanol, the group is silanol (a compound represented by Formula Si($R^2$)$_3$(OH). A plurality of $R^2$'s each independently represent a hydrogen atom or an alkyl group. At least one of the plurality of $R^2$'s represents an alkyl group.

Log $P_1$ may be lower or higher than log $P_2$.

Here, there is a tendency that a log P value of a general mesogenic group (log $P_2$ described above) is within a range of 4 to 6. In this case, in a case where log $P_1$ is lower than log P2, the value of log $P_1$ is preferably 1 or less, and more preferably 0 or less. In a case where log $P_1$ is higher than log P2, the value of log $P_1$ is preferably 8 or greater, and more preferably 9 or greater.

In a case where P1 in Formula (1) is obtained by polymerizing a (meth)acrylic acid ester and log $P_1$ is lower than log $P_2$, the log P value of SP1 in Formula (1) is preferably 0.7 or less, and more preferably 0.5 or less. In a case where P1 in Formula (1) is obtained by polymerizing a (meth)acrylic acid ester and log $P_1$ is higher than log P2, the log P value of SP1 in Formula (1) is preferably 3.7 or greater, and more preferably 4.2 or greater. Examples of the structure in which the log P value is 1 or less include an oxyethylene structure and an oxypropylene structure. Examples of the structure in which the log P value is 6 or greater include a polysiloxane structure and a fluorinated alkylene structure.

<Repeating Unit (2)>

The repeating unit (2) is a repeating unit with a molecular weight of 280 or less. The repeating unit (2) may be a repeating unit containing a mesogenic group or a repeating unit containing no mesogenic group, and is preferably a repeating unit containing no mesogenic group due to the following reason.

That is, in a case where a repeating unit containing no mesogenic group is introduced into the side chain type polymer liquid crystalline compound, it is thought that the alignment degree of a light absorption anisotropic film which is formed using the repeating unit decreases. However, in a case where the repeating unit (2) has a small molecular weight, the alignment of the repeating unit (1) is not easily disturbed even in a case where the repeating unit (2) contains no mesogenic group. Accordingly, it is thought that it is possible to maintain the excellent alignment degree of the light absorption anisotropic film can be maintained. Accordingly, it is preferable that the repeating unit (2) is a repeating unit containing no mesogenic group from the viewpoint that the effects of the invention are remarkably exhibited.

In addition, since the definition and specific example of the mesogenic group are as described above, the description thereof will be omitted.

The molecular weight of the repeating unit (2) does not mean a molecular weight of a monomer used to obtain the repeating unit (2), but means a molecular weight of the repeating unit (2) put in a state of being incorporated into the polymer liquid crystalline compound by polymerization of a monomer.

The molecular weight of the repeating unit (2) is 280 or less, preferably 180 or less, and more preferably 100 or less. The lower limit value of the molecular weight of the repeating unit (2) is usually 40 or greater, and more preferably 50 or greater. In a case where the molecular weight of the repeating unit (2) is 280 or less, a light absorption anisotropic film which is excellent in the solubility of the polymer liquid crystalline compound and has a high alignment degree is obtained.

On the other hand, in a case where the molecular weight of the repeating unit (2) exceeds 280, the liquid crystal alignment of the repeating unit (1) moiety is disturbed, and thus the alignment degree of a light absorption anisotropic film is lowered. In addition, since it becomes difficult for a solvent to enter the polymer liquid crystalline compound, the solubility of the polymer liquid crystalline compound is lowered.

Specific examples of the repeating unit (2) include a repeating unit containing no crosslinking group (for example, an ethylenically unsaturated group) (hereinafter, also referred to as "repeating unit (2-1)") and a repeating unit containing a crosslinking group (hereinafter, also referred to as "repeat unit (2-2)").

<Repeating Unit (2-1)>

Specific examples of the monomer used for the polymerization of the repeating unit (2-1) include acrylic acid [72.1], α-alkyl acrylic acids (for example, methacrylic acid [86.1] and itaconic acid [130.1]), esters and amides derived therefrom (for example, N-i-propylacrylamide [113.2], N-n-butylacrylamide [127.2], N-t-butylacrylamide [127.2], N,N-dimethylacrylamide [99.1], N-methylmethacrylamide [99.1], acrylamide [71.1], methacrylamide [85.1], diacetone acrylamide [169.2], acryloyl morpholine [141.2], N-methylolacrylamide [101.1], N-methylolmethacrylamide [115.1], methyl acrylate [86.0], ethyl acrylate [100.1], hydroxyethyl acrylate [116.1], n-propyl acrylate [114.1], i-propyl acrylate [114.2], 2-hydroxypropyl acrylate [130.1], 2-methyl-2-nitropropyl acrylate [173.2], n-butyl acrylate [128.2], i-butyl acrylate [128.2], t-butyl acrylate [128.2], t-pentyl acrylate [142.2], 2-methoxyethyl acrylate [130.1], 2-ethoxyethyl acrylate [144.2], 2-ethoxyethoxyethyl acrylate [188.2], 2,2,2-trifluoroethyl acrylate [154.1], 2,2-dimethylbutyl acrylate [156.2], 3-methoxybutyl acrylate [158.2], ethyl carbitol acrylate [188.2], phenoxyethyl acrylate [192.2], n-pentyl acrylate [142.2]], n-hexyl acrylate [156.2], cyclohexyl acrylate [154.2], cyclopentyl acrylate [140.2], benzyl acrylate [162.2], n-octyl acrylate [184.3], 2-ethylhexyl acrylate [184.3], 4-methyl-2-propylpentyl acrylate [198.3], methyl methacrylate [100.1], 2,2,2-trifluoroethyl methacrylate [168.1], hydroxyethyl methacrylate [130.1], 2-hydroxypropyl methacrylate [144.2], n-butyl methacrylate [142.2], i-butyl methacrylate [142.2], sec-butyl methacrylate [142.2], n-octyl methacrylate [198.3], 2-ethylhexyl methacrylate [198.3], 2-methoxyethyl methacrylate [144.2], 2-ethoxyethyl methacrylate [158.2], benzyl methacrylate [176.2], 2-norbornylmethyl methacrylate [194.3], 5-norbornen-2-yl-methyl methacrylate [194.3], and dimethylaminoethyl methacrylate [157.2]), vinyl esters (for example, vinyl acetate [86.1]), esters derived from maleic acid or fumaric acid (for example, dimethyl maleate [144.1] and diethyl fumarate [172.2]), maleimides (for example, N-phenylmaleimide [173.2]), maleic acid [116.1], fumaric acid [116.1], p-styrene sulfonic acid [184.1], acrylonitrile [53.1], methacrylonitrile [67.1], dienes (for example, butadiene [54.1], cyclopentadiene [66.1], and isoprene [68.1]), aromatic vinyl compounds (for example, styrene [104.2], p-chlorostyrene [138.6], t-butylstyrene [160.3], and α-methylstyrene [118.2]), N-vinylpyrrolidone [111.1], N-vinyloxazolidone [113.1], N-vinylsuccinimide [125.1], N-vinylformamide [71.1], N-vinyl-N-methylformamide [85.1], N-vinylacetamide [85.1], N-vinyl-N-methylacetamide [99.1], 1-vinyl Imidazole [94.1], 4-vinylpyridine [105.2], vinyl sulfonic acid [108.1], sodium vinyl sulfonate [130.2], sodium allyl sulfonate [144.1], sodium methallylsulfonate [158.2], vinylidene chloride [96.9], vinyl alkyl ethers (for example, methyl vinyl ether [58.1]), ethylene [28.0], propylene [42.1], 1-butene [56.1], and isobutene [56.1]. The numerical value in a square brackets means the molecular weight of a monomer.

The monomers may be used alone or in combination of two or more kinds thereof.

Among the above monomers, acrylic acid, α-alkylacrylic acids, esters and amides derived therefrom, acrylonitrile, methacrylonitrile, and aromatic vinyl compounds are preferable.

A monomers other than the above-described monomers, for example, the compounds described in Research Disclosure No. 1955 (July, 1980) can be used.

Specific examples of the repeating unit (2-1) and molecular weights thereof are shown below, but the invention is not limited to these specific examples.

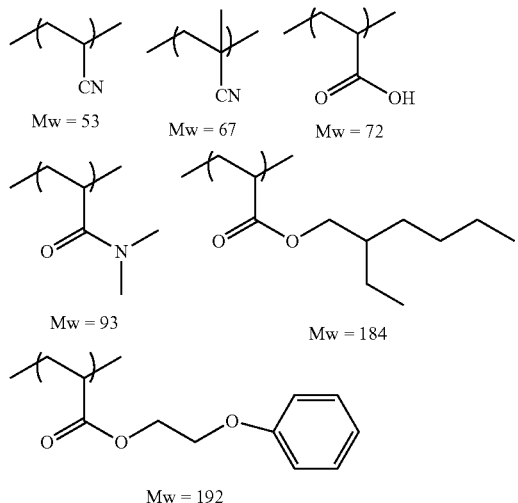

<Repeating Unit (2-2)>

Specific examples of the crosslinkable group in the repeating unit (2-2) include ethylenically unsaturated groups such as an epoxy group, a vinyl group, a vinyloxy group, a styryl group, a p-(2-phenylethenyl)phenyl group, an acryloyl group, a methacryloyl group, an acryloyloxy group, and a methacryloyloxy group, and an oxetanyl group.

The repeating unit (2-2) is preferably a repeating unit represented by Formula (2) from the viewpoint of easy polymerization.

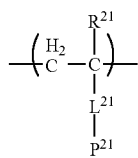

(2)

In Formula (2), $R^{21}$ represents a hydrogen atom or an alkyl group having 1 to 4 carbon atoms, and is preferably a hydrogen atom or a methyl group.

$L^{21}$ represents a single bond or a divalent linking group, and is preferably a single bond, —O—, an alkylene group, an arylene group, or *—COO—, *—CONH—, *—OCO—, or *—NHCO-linked to the main chain on the * side.

$P^{21}$ represents a monovalent group containing an ethylenically unsaturated group, is preferably a monovalent group containing an acryloyl group, a methacryloyl group, a maleimide group, a styryl group, or a 1-cyclopentene-3,5-dione group, and more preferably an monovalent group containing an acryloyl group, a methacryloyl group, a maleimide group, or a styryl group.

In Formula (2), as a preferable combination of $R^{21}$, $L^{21}$, and $P^{21}$, $R^{21}$ is a hydrogen atom or a methyl group, $L^{21}$ is an arylene group, *—COO—, *—CONH—, or *—OCO, $P^{21}$ is a monovalent group containing an acryloyl group, a methacryloyl group, a maleimide group, or a styryl group.

Specific examples of the repeating unit (2-2) and molecular weights thereof are shown below, but the invention is not limited to these specific examples.

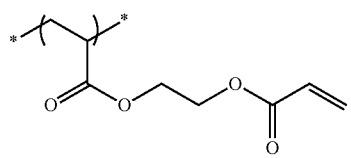

Molecular Weight: 170.16

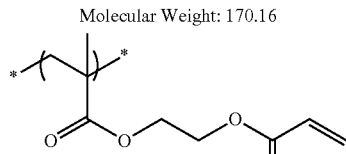

Molecular Weight: 184.19

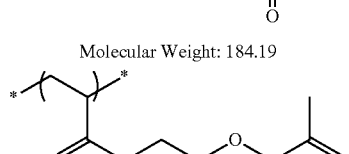

Molecular Weight: 184.19

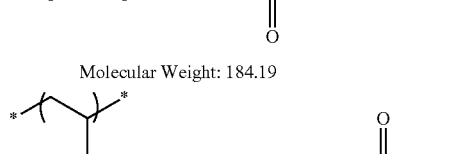

Molecular Weight: 214.22

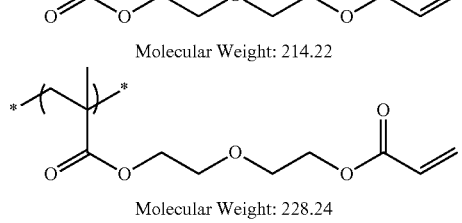

Molecular Weight: 228.24

-continued

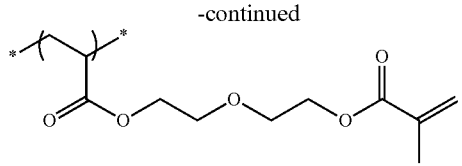

Molecular Weight: 228.24

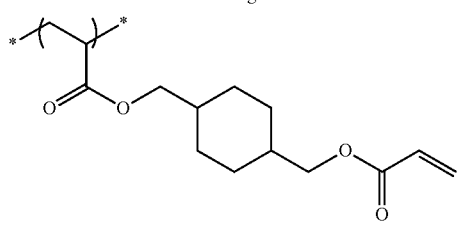

Molecular Weight: 252.31

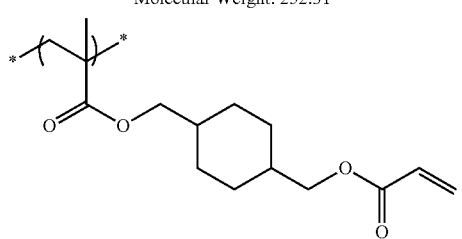

Molecular Weight: 266.34

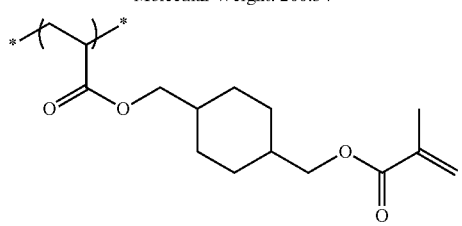

Molecular Weight: 266.34

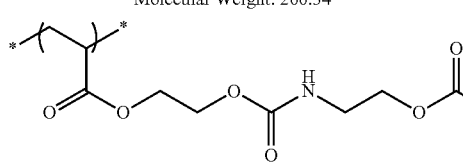

Molecular Weight: 257.24

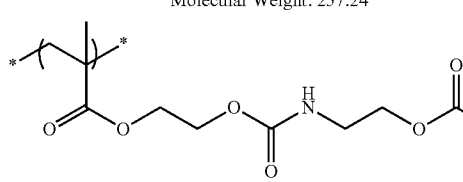

Molecular Weight: 271.27

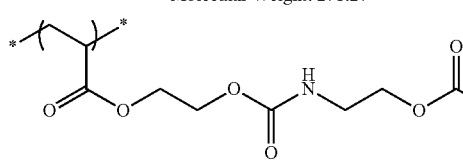

Molecular Weight: 271.27

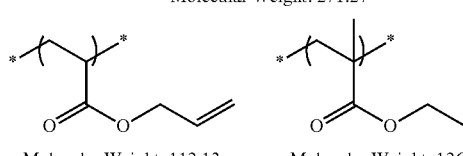

Molecular Weight: 112.13    Molecular Weight: 126.16

-continued

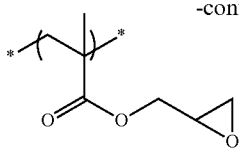

Molecular Weight: 142.15

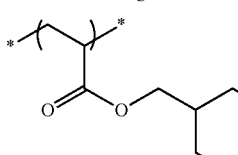

Molecular Weight: 182.22

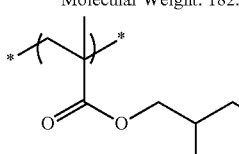

Molecular Weight: 196.25

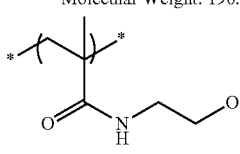

Molecular Weight: 183.21

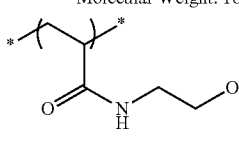

Molecular Weight: 169.18

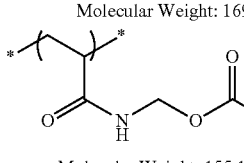

Molecular Weight: 155.15

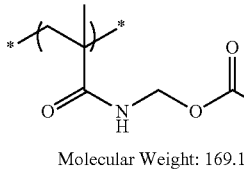

Molecular Weight: 169.18

The content of the repeating unit (2) is less than 14% by mass, preferably 7% by mass or less, and more preferably 5% by mass or less with respect to a total mass (100% by mass) of the polymer liquid crystalline compound. The lower limit value of the repeating unit (2) is preferably 2% by mass or greater, and more preferably 3% by mass or greater. In a case where the content of the repeating unit (2) is less than 14% by mass, the alignment degree of a light absorption anisotropic film is further improved. In a case where the content of the repeating unit (2) is 2% by mass or greater, the solubility of the polymer liquid crystalline compound is further improved.

The polymer liquid crystalline compound may contain only one kind of repeating unit (2) or two or more kinds of repeating units (2). In a case where two or more kinds of repeating units (2) are contained, the total amount thereof is preferably within the above range.

The content of the polymer liquid crystalline compound is preferably 20% to 97% by mass, and more preferably 30% to 96% by mass with respect to a total solid content (100% by mass) of the liquid crystal composition.

<Substituent W>

The substituent W in this specification will be described.

Examples of the substituent W include a halogen atom, an alkyl group (for example, a tert-butyl group) (including a cycloalkyl group, a bicycloalkyl group, or a tricycloalkyl group), an alkenyl group (including a cycloalkenyl group or a bicycloalkenyl group), an alkynyl group, an aryl group, a heterocyclic group (may also be referred to as heterocyclic group), a cyano group, a hydroxy group, a nitro group, a carboxy group, an alkoxy group, an aryloxy group, a silyloxy group, a heterocyclicoxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphato group (—OPO(OH)$_2$), a sulfato group (—OSO$_3$H), and other known substituents.

The details of the substituent are disclosed in paragraph [0023] of JP2007-234651A.

<Physical Properties>

A weight-average molecular weight (Mw) of the polymer liquid crystalline compound is preferably 1,000 to 500,000, and more preferably 2,000 to 300,000. In a case where Mw of the polymer liquid crystalline compound is within the above range, handling of the polymer liquid crystalline compound is facilitated.

Particularly, from the viewpoint of suppression of cracks during coating, the weight-average molecular weight (Mw) of the polymer liquid crystalline compound is preferably 10,000 or greater, and more preferably 10,000 to 300,000.

From the viewpoint of the temperature latitude of the alignment degree, the weight-average molecular weight (Mw) of the polymer liquid crystalline compound is preferably less than 10,000, and more preferably 2,000 to less than 10,000.

Here, in the invention, the weight-average molecular weight and the number average molecular weight are values measured by gel permeation chromatography (GPC).

Solvent (eluant): N-methylpyrrolidone
Device Name: TOSOH HLC-8220GPC
Column: Three columns (TOSOH TSK gel Super AWM-H (6 mm×15 cm)) are connected and used.
Column Temperature: 25° C.
Sample Concentration: 0.1% by mass
Flow Rate: 0.35 mL/min
Calibration Curve: Using a calibration curve obtained using 7 TSK standard polystyrene samples manufactured by TOSOH Corporation Mw=2,800,000 to 1,050 (Mw/Mn=1.03 to 1.06).

The liquid crystallinity of the polymer liquid crystalline compound may be either nematic or smectic, but is preferably at least nematic.

The temperature range in which a nematic phase is exhibited is preferably room temperature (23° C.) to 4500° C., and is more preferably 50° C. to 400° C. from the viewpoint of handling and manufacturing suitability.

[Dichroic Substance]

In the invention, the dichroic substance is not particularly limited, and a conventionally known dichroic dye can be used.

Specific examples of the dichroic substance include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-014883A, paragraphs [0012] to [0029] of JP2013-109090A, paragraphs [0009] to [0017] of JP2013-101328A, paragraphs [0051] to [0065] of JP2013-037353A, paragraphs [0049] of JP2012-063387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0022] to [0080] of JP2015-001425A, paragraphs [0005] to [0051] of JP2016-006502A, paragraphs [0005] to [0041] of WO2016/060173A, paragraphs [0008] of WO2016/136561A, paragraphs [0014] to [0033] of JP2016-044909A, paragraphs [0014] to [0033] of JP2016-044910A, paragraphs [0013] to [0037] of JP2016-095907A and paragraphs [0014] to [0034] of JP2017-045296A.

In the invention, two or more kinds of dichroic substances may be used in combination. For example, from the viewpoint of making a color of the light absorption anisotropic film close to black, at least one kind of dye compound having a maximum absorption wavelength in a wavelength range of 370 to 550 nm, and at least one kind of dye compound having a maximum absorption wavelength in a wavelength range of 500 to 700 nm are preferably used in combination.

In the invention, the dichroic substance preferably has a crosslinking group since the pressing resistance is further improved.

Specific examples of the crosslinking group include a (meth)acryloyl group, an epoxy group, an oxetanyl group, and a styryl group, and among these, a (meth)acryloyl group is preferable.

The content of the dichroic substance is greater than 2% by mass, preferably 4% by mass or greater, and more preferably 10% by mass or greater with respect to a total solid content (100° % by mass) of the liquid crystal composition. The upper limit value of the content of the dichroic substance is preferably 80% by mass or less, more preferably 40% by mass or less, and even more preferably 30% by mass or less. In a case where the content of the dichroic substance is greater than 2% by mass, a light absorption anisotropic film having a high alignment degree is obtained. In a case where the content of the dichroic substance is 80% by mass or less, the surface uniformity is excellent.

In addition, in a case where the liquid crystal composition according to the embodiment of the invention contains two or more kinds of dichroic substances, the total amount thereof is preferably within the above range.

[Polymerization Initiator]

The liquid crystal composition according to the embodiment of the invention preferably contains a polymerization initiator.

The polymerization initiator is not particularly limited, and a photosensitive compound, that is, a photopolymerization initiator is preferable.

As the photopolymerization initiator, various kinds of compounds can be used with no particular limitation. Examples of the photopolymerization initiator include α-carbonyl compounds (the specifications of U.S. Pat. Nos. 2,367,661A and 2,367,670A), acyloin ethers (the specification of U.S. Pat. No. 2,448,828A), aromatic acyloin compounds substituted by α-hydrocarbon (the specification of U.S. Pat. No. 2,722,512A), polynuclear quinone compounds (the specifications of U.S. Pat. Nos. 3,046,127A and 2,951,758A), combinations of triarylimidazole dimers and p-aminophenyl ketones (the specification of U.S. Pat. No. 3,549,367A), acridine and phenazine compounds (the specifications of JP1985-105667A (JP-S60-105667A) and U.S. Pat. No. 4,239,850A), oxadiazole compounds (the specification of U.S. Pat. No. 4,212,970A), and acylphosphine oxide compounds (JP1988-040799B (JP-S63-040799B), JP1993-029234B (JP-H5-029234B), JP1998-095788B (JP-H10-095788B), and JP1998-029997B (JP-H10-029997B)).

A commercially available product can also be used as the photopolymerization initiator, and examples thereof include IRGACURE 184, 907, 369, 651, 819, OXE-01, and OXE-02 manufactured by BASF SE.

In a case where the liquid crystal composition according to the embodiment of the invention contains a polymerization initiator, the content of the polymerization initiator is preferably 0.01 to 30 parts by mass, and more preferably 0.1 to 15 parts by mass with respect to a total of 100 parts by mass of the dichroic substance and the polymer liquid crystalline compound in the liquid crystal composition. In a case where the content of the polymerization initiator is 0.01 parts by mass or greater, the durability of a light absorption anisotropic film is improved, and in a case where the content of the polymerization initiator is 30 parts by mass or less, the alignment of a light absorption anisotropic film is improved.

[Solvent]

From the viewpoint of workability and the like, the liquid crystal composition according to the embodiment of the invention preferably contains a solvent. Examples of the solvent include organic solvents such as ketones (for example, acetone, 2-butanone, methyl isobutyl ketone, cyclopentanone, and cyclohexanone), ethers (for example, dioxane, tetrahydrofuran, 2-methyltetrahydrofuran, cyclopentyl methyl ether, tetrahydropyran, and dioxolan), aliphatic hydrocarbons (for example, hexane), alicyclic hydrocarbons (for example, cyclohexane), aromatic hydrocarbons (for example, benzene, toluene, xylene, and trimethylbenzene), halogenated carbons (for example, dichloromethane, trichloromethane, dichloroethane, dichlorobenzene, and chlorotoluene), esters (for example, methyl acetate, ethyl acetate, butyl acetate, and ethyl lactate), alcohols (for example, ethanol, isopropanol, butanol, cyclohexanol, isopentyl alcohol, neopentyl alcohol, diacetone alcohol, and benzyl alcohol), cellosolves (for example, methyl cellosolve, ethyl cellosolve, and 1,2-dimethoxyethane), cellosolve acetates, sulfoxides (for example, dimethyl sulfoxide), amides (for example, dimethylformamide, dimethylacetamide, N-methylpyrrolidone, and N-ethylpyrrolidone), and heterocyclic compounds (for example, pyridine), and water. These solvents may be used alone or in combination of two or more kinds thereof.

Among these solvents, ketones (particularly, cyclopentanone and cyclohexanone), ethers (particularly, tetrahydrofuran, cyclopentyl methyl ether, tetrahydropyran, and dioxolan) and amides (particularly, dimethylformamide, dimethylacetamide, N-methylpyrrolidone, and N-ethylpyrrolidone) are preferable from the viewpoint of utilizing the effect that the solubility is excellent.

In a case where the liquid crystal composition according to the embodiment of the invention contains a solvent, the content of the solvent is preferably 80% to 99% by mass, more preferably 83% to 98% by mass, and even more preferably 85% to 96% by mass with respect to a total mass of the liquid crystal composition.

[Interface Improver]

The liquid crystal composition according to the embodiment of the invention preferably contains an interface improver. Due to the interface improver contained, the smoothness of the coating surface is improved, and the alignment degree is improved or cissing and unevenness are suppressed. Thus, an improvement in the in-plane uniformity is anticipated.

As the interface improver, a material making the liquid crystalline compound horizontal on the coating surface side is preferable, and the compounds (horizontal alignment agents) described in paragraphs [0253] to [0293] of JP2011-237513A can be used. The fluorine (meth)acrylate-based polymers described in paragraphs [0018] to [0043] of JP2007-272185A and the like can also be used. Other compounds may also be used as the interface improver.

In a case where the liquid crystal composition according to the embodiment of the invention contains an interface improver, the content of the interface improver is preferably 0.001 to 5 parts by mass, and more preferably 0.01 to 3 parts by mass with respect to a total of 100 parts by mass of the dichroic substance and the polymer liquid crystalline compound in the liquid crystal composition.

[Light Absorption Anisotropic Film]

The light absorption anisotropic film according to the embodiment of the invention is formed using the above-described liquid crystal composition according to the embodiment of the invention.

Examples of the method of manufacturing the light absorption anisotropic film according to the embodiment of the invention include a method including, in order, a step of forming a coating film by applying the liquid crystal composition to a base material (hereinafter, also referred to as "coating film forming step") and a step of aligning a dichroic substance contained in the coating film (hereinafter, also referred to as "alignment step").

Hereinafter, the respective steps of the method of manufacturing the light absorption anisotropic film according to the embodiment of the invention will be described.

[Coating Film Forming Step]

The coating film forming step is a step of forming a coating film by applying the liquid crystal composition to a base material.

By using a liquid crystal composition containing the above-described solvent, or a liquid material such as a molten liquid obtained by heating the liquid crystal composition, the liquid crystal composition is easily applied to the base material.

Examples of the method of applying the liquid crystal composition include known methods such as a roll coating method, a gravure printing method, a spin coating method, a wire bar coating method, an extrusion coating method, a direct gravure coating method, a reverse gravure coating method, a die-coating method, a spray method, and an ink jet method. In this aspect, an example has been given in which the liquid crystal composition is applied to the base material, but the invention is not limited thereto. For example, the liquid crystal composition may be applied to an alignment film provided on the base material. Details of the base material and the alignment film will be described later.

[Alignment Step]

The alignment step is a step of aligning a dichroic substance contained in the coating film. Thus, a light absorption anisotropic film is obtained.

The alignment step may have a drying treatment. Through the drying treatment, a component such as a solvent can be removed from the coating film. The drying treatment may be performed by a method of leaving the coating film for a predetermined time at room temperature (for example, natural drying), or a heating and/or air blowing method.

Here, the dichroic substance contained in the liquid crystal composition may be aligned by the above-described coating film forming step or drying treatment. For example, in an aspect in which the liquid crystal composition is prepared as a coating liquid containing a solvent, the coating film is dried to remove the solvent from the coating film, and thus a coating film having light absorption anisotropy (that is, light absorption anisotropic film) is obtained.

The alignment step preferably has a heating treatment. Accordingly, the dichroic substance contained in the coating film can be aligned, and thus the coating film after the heating treatment can be preferably used as a light absorption anisotropic film.

The heating treatment is preferably performed at 10° C. to 250° C., and more preferably at 25° C. to 190° C. in view of manufacturing suitability or the like. The heating time is preferably 1 to 300 seconds, and more preferably 1 to 60 seconds.

The alignment step may have a cooling treatment to be performed after the heating treatment. The cooling treatment is a treatment for cooling the coating film after the heating to about room temperature (20° C. to 25° C.). Accordingly, the alignment of the dichroic substance contained in the coating film can be fixed. The cooling means is not particularly limited, and the cooling can be performed by a known method.

By the above steps, a light absorption anisotropic film can be obtained. In this aspect, examples of the method of aligning the dichroic substance contained in the coating film include the drying treatment and the heating treatment, but are not limited thereto, and a known alignment treatment can be used.

[Other Steps]

The method of manufacturing a light absorption anisotropic film may have a step of curing the light absorption anisotropic film (hereinafter, also referred to as "curing step") after the alignment step.

For example, the curing step is performed by heating and/or light irradiation (exposure). Among these, light irradiation is preferably performed to conduct the curing step.

As the light source used for curing, various light sources can be used such as infrared rays, visible light, and ultraviolet rays, and ultraviolet rays are preferable. In the curing, ultraviolet rays may be applied during heating, or may be applied via a filter which transmits only a component with a specific wavelength.

In addition, the exposure may be performed under a nitrogen atmosphere. In a case where the light absorption anisotropic film is cured by radical polymerization, inhibition of the polymerization by oxygen is reduced, and thus the exposure is preferably performed under a nitrogen atmosphere.

The film thickness of the light absorption anisotropic film is preferably 0.1 to 5.0 µm, and more preferably 0.3 to 1.5 µm. Although depending on the concentration of the dichroic substance in the liquid crystal composition, a light absorption anisotropic film having an excellent absorbance is obtained in a case where the film thickness is 0.1 µm or greater, and a light absorption anisotropic film having an excellent transmittance is obtained in a case where the film thickness is 5.0 µm or less.

[Laminate]

A laminate according to the embodiment of the invention has a base material and the light absorption anisotropic film according to the embodiment of the invention formed on the base material.

The laminate according to the embodiment of the invention may further have a λ/4 plate formed on the light absorption anisotropic film.

In addition, the laminate according to the embodiment of the invention may have an alignment film between the base material and the light absorption anisotropic film.

The laminate according to the embodiment of the invention may further have a barrier layer between the light absorption anisotropic film and the λ/4 plate.

Hereinafter, the constituent layers of the laminate according to the embodiment of the invention will be described.

[Base Material]

The base material can be selected in accordance with usage of the light absorption anisotropic film, and examples thereof include glass and a polymer film. The light transmittance of the base material is preferably 80% or greater.

In a case where a polymer film is used as the base material, an optically isotropic polymer film is preferably used. As specific examples and preferable aspects of the polymer, those described in a paragraph [0013] of JP2002-022942A can be applied. In addition, even a conventionally known polymer such as polycarbonate or polysulfone in which birefringence is likely to be developed can also be used by reducing the developability through molecular modification described in WO00/026705A.

[Light Absorption Anisotropic Film]

Since the light absorption anisotropic film is as described above, the description thereof will be omitted.

[λ/4 Plate]

The "λ/4 plate" is a plate having a λ/4 function, and is specifically, a plate having a function of converting linearly polarized light with a specific wavelength into circularly polarized light (or converting circularly polarized light into linearly polarized light).

For example, in an aspect in which the λ/4 plate has a single layer structure, specific examples of the plate include a retardation film in which an optically anisotropic layer having a λ/4 function is provided on a stretched polymer film or a support. In an aspect in which the λ/4 plate has a multilayered structure, specific examples of the plate include a broadband λ/4 plate having a laminate of a λ/4 plate and a λ/2 plate.

The λ/4 plate and the light absorption anisotropic film may be provided in contact with each other, or another layer may be provided between the λ/4 plate and the light absorption anisotropic film. Examples of the layer include a pressure sensitive adhesive layer or an adhesive layer for securing adhesiveness and a barrier layer.

[Barrier Layer]

In a case where the laminate according to the embodiment of the invention has a barrier layer, the barrier layer is provided between the light absorption anisotropic film and the λ/4 plate. In a case where a layer other than the barrier layer (for example, a pressure sensitive adhesive layer or an adhesive layer) is provided between the light absorption anisotropic film and the λ/4 plate, the barrier layer can be provided between, for example, the light absorption anisotropic film and the above layer other than the barrier layer.

The barrier layer is also called a gas barrier layer (oxygen barrier layer), and has a function of protecting the light absorption anisotropic film from a gas such as oxygen in the atmosphere, moisture, or a compound contained in the adjacent layer.

Regarding the barrier layer, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] of JP2005-169994A can be referred to.

[Alignment Film]

The laminate according to the embodiment of the invention may have an alignment film between the base material and the light absorption anisotropic film.

As the alignment film, any layer may be used as long as it allows the dichroic substance contained in the liquid crystal composition according to the embodiment of the invention to have a desired alignment state on the alignment film.

The alignment film can be provided by means of a rubbing treatment on the film surface with an organic compound (preferably a polymer), oblique vapor deposition of an inorganic compound, forming a layer having microgrooves, or accumulation of an organic compound (for example, o-tricosanoic acid, dioctadecylmethylammonium chloride or methyl stearate) by the Langmure-Blogette method (LB film). Furthermore, there have been known alignment films having an aligning function imparted thereto by applying an electrical field, applying a magnetic field, or light irradiation. In the invention, among these, an alignment film formed by a rubbing treatment is preferable in view of easy control of a pretilt angle of the alignment film, and a photo-alignment film formed by light irradiation is also preferable in view of alignment uniformity.

<Rubbed Alignment Film>

The polymer material used for an alignment film formed by a rubbing treatment is described in many literatures, and many commercially available products are available. In the invention, polyvinyl alcohol or polyimide, or derivatives thereof can be preferably used. Regarding the alignment film, the description in the 24th line on page 43 to 8th line on page 49 in WO2001/088574A1 can be referred to. The thickness of the alignment film is preferably 0.01 to 10 μm, and more preferably 0.01 to 1 μm.

<Photo-Alignment Film>

The photo-alignment material used for an alignment film formed by light irradiation is described in many literatures. In the invention, preferred examples thereof include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadimide compounds having photo-alignment units described in JP2002-265541A and JP2002-317013A, photocrosslinkable silane derivatives described in JP4205195B and JP4205198B, and photocrosslinkable polyimides, polyamides, and esters described in JP2003-520878A, JP2004-529220A, and JP4162850B. Azo compounds, photocrosslinkable polyimides, polyamides, and esters are more preferable.

To a photo-alignment film formed from the above-described material, linearly polarized light or unpolarized light is applied to manufacture a photo-alignment film.

In this specification, the "linearly polarized light irradiation" and the "unpolarized light irradiation" are operations for causing a photoreaction to the photo-alignment material. The wavelength of the light used varies depending on the photo-alignment material used and is not particularly limited as long as the wavelength is a wavelength necessary for the photoreaction. The peak wavelength of the light used for light irradiation is preferably 200 nm to 700 nm, and ultraviolet light having a light peak wavelength of 400 nm or less is more preferable.

The light source used for light irradiation is a usually used light source, and examples thereof include lamps such as a tungsten lamp, a halogen lamp, a xenon lamp, a xenon flash lamp, a mercury lamp, a mercury/xenon lamp, and a carbon arc lamp, various lasers [for example, a semiconductor laser, a helium/neon laser, an argon ion laser, a helium/cadmium laser, and an YAG (yttrium/aluminum/garnet) laser], light emitting diodes, and cathode ray tubes.

As means for obtaining linearly polarized light, a method using a polarizing plate (for example, an iodine polarizing plate, a dichroic dye polarizing plate, or a wire grid polarizing plate), a method using a prism-based element (for example, a GLAN-THOMSON prism) or a reflective polarizer using a BREWSTER angle, or a method using light emitted from a polarized laser light source can be employed. Only light having a necessary wavelength may be selectively applied by using a filter, a wavelength conversion element, or the like.

In a case where linearly polarized light is used as light for irradiation, a method of irradiating the alignment film with light from an upper surface or a rear surface in a direction vertical or oblique to the alignment film surface is employed. Although the incidence angle of the light varies depending on the photo-alignment material, the incidence angle is preferably 0° to 90° (vertical), and more preferably 40° to 90°. In a case where unpolarized light is used, the alignment film is irradiated with unpolarized light from an oblique direction. The incidence angle of the light is preferably 10° to 80°, more preferably 20° to 60°, and even more preferably 30° to 50°. The irradiation time is preferably 1 minute to 60 minutes, and more preferably 1 minute to 10 minutes.

In a case where patterning is required, a method of performing light irradiation using a photomask as many times as necessary for pattern formation, or a pattern writing method using laser beam scanning can be employed.

[Usage]

The laminate according to the embodiment of the invention can be used as a polarizing element (polarizing plate). For example, it can be used as a linearly polarizing plate or a circularly polarizing plate.

In a case where the laminate according to the embodiment of the invention has no optically anisotropic layer such as the λ/4 plate, the laminate can be used as a linearly polarizing plate.

In a case where the laminate according to the embodiment of the invention has the λ/4 plate, the laminate can be used as a circularly polarizing plate.

[Image Display Device]

An image display device according to the embodiment of the invention has the above-described light absorption anisotropic film or the above-described laminate.

The display element used for the image display device according to the embodiment of the invention is not particularly limited, and examples thereof include a liquid crystal cell, an organic electroluminescence (hereinafter, abbreviated as "EL"), a display panel, and a plasma display panel.

Among these, a liquid crystal cell or an organic EL display panel is preferable, and a liquid crystal cell is more preferable. That is, as the image display device according to the embodiment of the invention, a liquid crystal display device using a liquid crystal cell as a display element, or an organic EL display device using an organic EL display panel as a display element is preferable, and a liquid crystal display device is more preferable.

[Liquid Crystal Display Device]

A liquid crystal display device as an example of the image display device according to the embodiment of the invention preferably has an aspect in which it has the above-described light absorption anisotropic film and a liquid crystal cell. More preferably, the liquid crystal display device has the above-described laminate (but including no λ/4 plate) and a liquid crystal cell.

In the invention, it is preferable that the light absorption anisotropic film (laminate) according to the embodiment of the invention be used as a polarizing element on the front side among light absorption anisotropic films (laminates) to be provided on both sides of a liquid crystal cell, and it is more preferable that the light absorption anisotropic film (laminate) according to the embodiment of the invention be used as polarizing elements on the front side and the rear side.

Hereinafter, the liquid crystal cell of the liquid crystal display device will be described in detail.

<Liquid Crystal Cell>

The liquid crystal cell used for the liquid crystal display device is preferably a vertical alignment (VA) mode, an optically compensated bend (OCB) mode, an in-plane-switching (IPS) mode, or a twisted nematic (TN) mode, but is not limited thereto.

In a TN mode liquid crystal cell, without application of a voltage, rod-like liquid crystalline molecules are substantially horizontally aligned, and twist-aligned by 60° to 120°. The TN mode liquid crystal cell is most frequently used as a color thin film transistor (TFT) liquid crystal display device, and is described in many literatures.

In a VA mode liquid crystal cell, rod-like liquid crystalline molecules are substantially vertically aligned with no application of a voltage. The VA mode liquid crystal cell includes (1) a narrowly-defined VA mode liquid crystal cell in which rod-like liquid crystalline molecules are substantially vertically aligned with no application of a voltage, and are substantially horizontally aligned with the application of a voltage (described in JP1990-176625A (JP-H2-176625A)), (2) a (MVA mode) liquid crystal cell in which the VA mode is made into multi-domains in order to expand the viewing angle (described in SID97, Digest of tech. Papers (proceedings) 28 (1997) 845), (3) an (n-ASM mode) liquid crystal cell in which rod-like liquid crystalline molecules are substantially vertically aligned with no application of a voltage, and are twisted in multi-domains with the application of a voltage (described in the proceedings 58 and 59 of Japanese Liquid Crystal Conference (1998)), and (4) a SURVIVAL mode liquid crystal cell (announced at LCD internal 98). In addition, the VA mode liquid crystal cell may be any one of a patterned vertical alignment (PVA) type, an optical alignment type, or a polymer-sustained alignment (PSA) type. Details of these modes are described in JP2006-215326A and JP2008-538819A.

In an IPS mode liquid crystal cell, rod-like liquid crystalline molecules are substantially horizontally aligned with respect to a substrate, and the liquid crystalline molecules respond in a planar manner with the application of an electric field parallel to a substrate surface. The IPS mode displays a black image in a state in which no electric field is applied thereto, and the absorption axes of a pair of upper and lower polarizing plates are perpendicular to each other. A method of improving the viewing angle by reducing light leakage caused when a black image is displayed in an oblique direction using an optical compensation sheet is disclosed by JP1998-054982A (JP-H10-054982A), JP1999-202323A (JP-H11-202323A), JP1997-292522A (JP-H9-292522A), JP1999-133408A (JP-H11-133408A), JP1999-305217A (JP-H11-305217A), JP1998-307291 A (JP-H10-307291A), and the like.

[Organic EL Display Device]

An organic EL display device as an example of the image display device according to the embodiment of the invention preferably has an aspect in which it has a light absorption anisotropic film, λ/4 plate, and an organic EL display panel in this order from the visual recognition side.

More preferably, the organic EL display device has the above-described laminate having a λ/4 plate and an organic EL display panel in this order from the visual recognition side. In this case, the laminate has a base material, an alignment film to be provided as necessary, a light absorption anisotropic film, a barrier layer to be provided as necessary, and a λ/4 plate disposed in this order from the visual recognition side.

In addition, the organic EL display panel is a display panel configured using an organic EL element in which an organic light emitting layer (organic electroluminescence layer) is interposed between electrodes (between a cathode and an anode). The configuration of the organic EL display panel is not particularly limited, and a known configuration is employed.

EXAMPLES

Hereinafter, the invention will be more specifically described based on examples. Materials, used amounts, ratios, treatment contents, treatment procedures, and the like shown in the following examples are able to be properly changed without departing from the gist of the invention. Therefore, the scope of the invention will not be restrictively interpreted by the following examples.

[Synthesis of Polymer Liquid Crystalline Compound]

A polymer liquid crystalline compound was produced according to the following procedures.

<Synthesis of Compound P1-1>

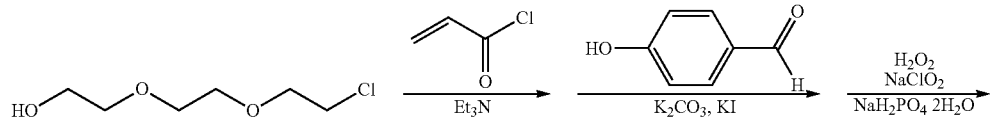

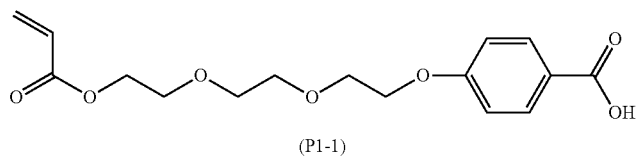

(P1-1)

Dibutylhydroxytoluene (BHT) (100 mg) was added to a dimethylacetamide (DMAc) solution (60 mL) of 2-chloroethoxyethoxyethanol (14.05 g), and acrylic acid chloride (7.54 g) and triethylamine (Et$_3$N) (8.89 g) were added dropwise under ice cooling. After stirring for 1 hour, the reaction liquid was filtered. Next, potassium carbonate (15.7 g), potassium iodide (0.57 g), p-hydroxybenzaldehyde (9.25 g), and dibutylhydroxytoluene (BHT) (100 mg) were added. After stirring at 110° C. for 4 hours, ethyl acetate and water were added to wash the reaction liquid by a liquid separating operation. The reaction liquid was concentrated by an evaporator. Then, the temperature was returned to room temperature, and 25 mL of acetonitrile, a phosphate buffer obtained by dissolving 2.36 g of sodium dihydrogen phosphate dihydrate in 8 mL of water, and 11.2 mL of hydrogen peroxide water (30% by mass) were added. Next, 33.4 g of a 25% by mass aqueous sodium chlorite solution was added. After stirring for 6 hours at room temperature and leaving for 8 hours, water was added, and the obtained precipitates were collected to obtain 16.9 g of a compound (P1-1) (yield: 69%) as a white solid.

<Synthesis of Compound P1-2>

Dibutylhydroxytoluene (BHT) (200 mg) was added to a tetrahydrofuran (THF) solution (70 mL) of methanesulfonyl chloride (MsCl) (73.4 mmol, 5.7 mL) and cooled to an internal temperature of −5° C. The compound (P1-1) (66.7 mmol, 21.6 g) and a THF solution of diisopropylethylamine (DIPEA) (75.6 mmol, 13.0 mL) were added dropwise thereto such that the internal temperature did not increase to 0° C. or higher. After stirring for 30 minutes at −5° C., N,N-dimethyl-4-aminopyridine (DMAP) (200 mg) was added, and diisopropylethylamine (75.6 mmol, 13.0 mL), tetrahydrofuran (THF) of 4-hydroxy-4'-methoxybiphenyl (60.6 mmol, 12.1 g), and a dimethylacetamide (DMAc) solution were added dropwise such that the internal temperature did not increase to 0° C. or higher. Then, stirring was performed for 4 hours at room temperature. The reaction was stopped by adding methanol (5 mL), and then water and ethyl acetate were added. The solvent was removed from the organic layer extracted with the ethyl acetate by a rotary evaporator, and purification by column chromatography using ethyl acetate and hexane was performed to obtain 18.7 g of a compound (P1-2) (yield: 61%) as a white solid.

$^1$H-NMR (solvent: CDCl$_3$) δ (ppm): 3.65 to 3.82 (m, 6H), 3.85 (s, 3H), 3.85 to 3.95 (m, 2H), 4.18 to 4.28 (m, 2H), 4.28 to 4.40 (m, 2H), 5.82 (dd, 1H), 6.15 (dd, 1H), 6.43 (dd, 1H), 6.90 to 7.05 (m, 4H), 7.20 to 7.30 (m, 2H), 7.45 to 7.65 (m, 4H), 8.10 to 8.20 (m, 2H)

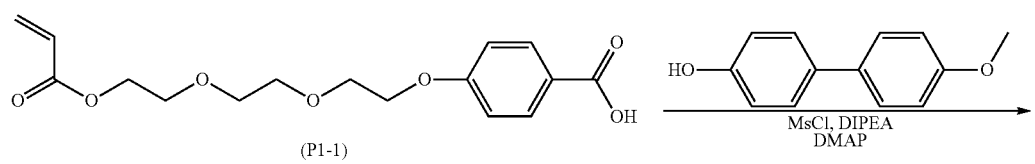

(P1-1)

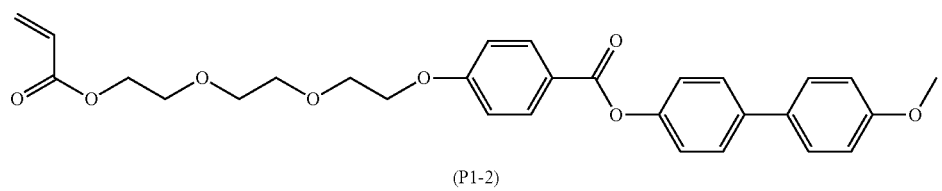

(P1-2)

(Synthesis of Copolymer (Polymer Liquid Crystalline Compound) Having Repeating Unit (L-1) and Repeating Unit (S-3))

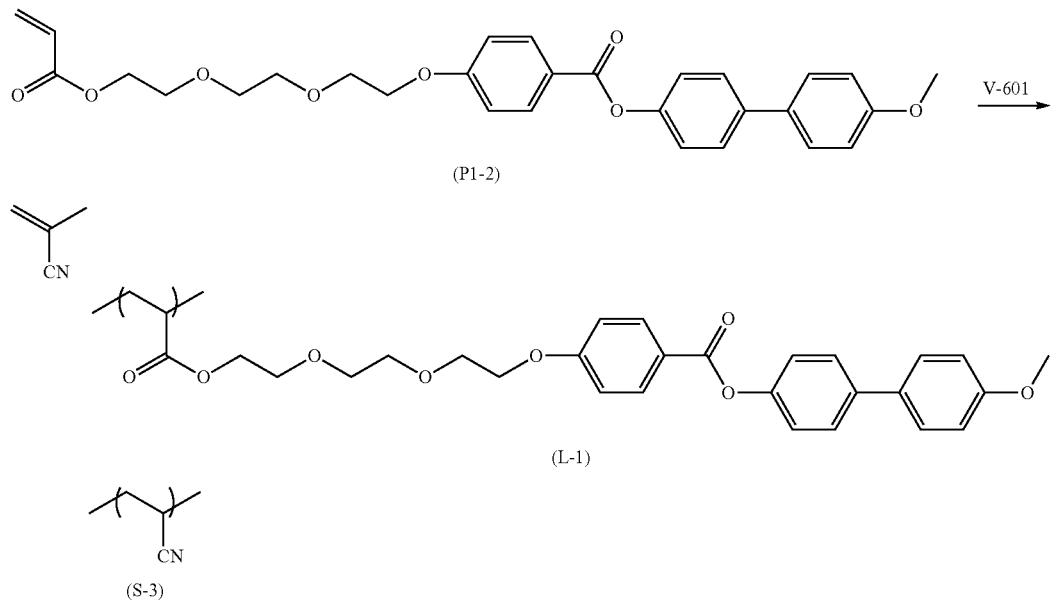

A DMAc solution (3.3 mL) of the compound (P1-2) (0.96 g) and methacrylonitrile (0.04 g) was heated to an internal temperature of 80° C. under a nitrogen stream. A DMAc solution (0.5 mL) of 2,2'-azobis(2-methylpropionic acid) dimethyl (0.54 mmol, 0.12 g) (trade name "V-601", manufactured by FUJIFILM Wako Pure Chemical Corporation) was added thereto, and stirring was performed for 2 hours at 80° C. Thereafter, disappearance of the polymerizable group was confirmed by $^1$H-NMR spectrum measurement, and the solution was cooled to room temperature. Methanol was added for filtering, and the residues were washed with methanol to obtain 0.95 g of a copolymer as a white solid having a repeating unit (L-1) and a repeating unit (S-3). A weight-average molecular weight (Mw) of the obtained polymer was 13,000.

The molecular weight was calculated in terms of polystyrene by gel permeation chromatography (GPC) with the use of TSKgel SuperHZM-H, TSKgel SuperHZ4000, and TSKgel SuperHZ2000 (manufactured by Tosoh Corporation) as columns and N-methylpyrrolidone as a solvent.

(Synthesis of Copolymer (Polymer Liquid Crystalline Compound) Having Repeating Unit (L-1) And Repeating Unit (S-4))

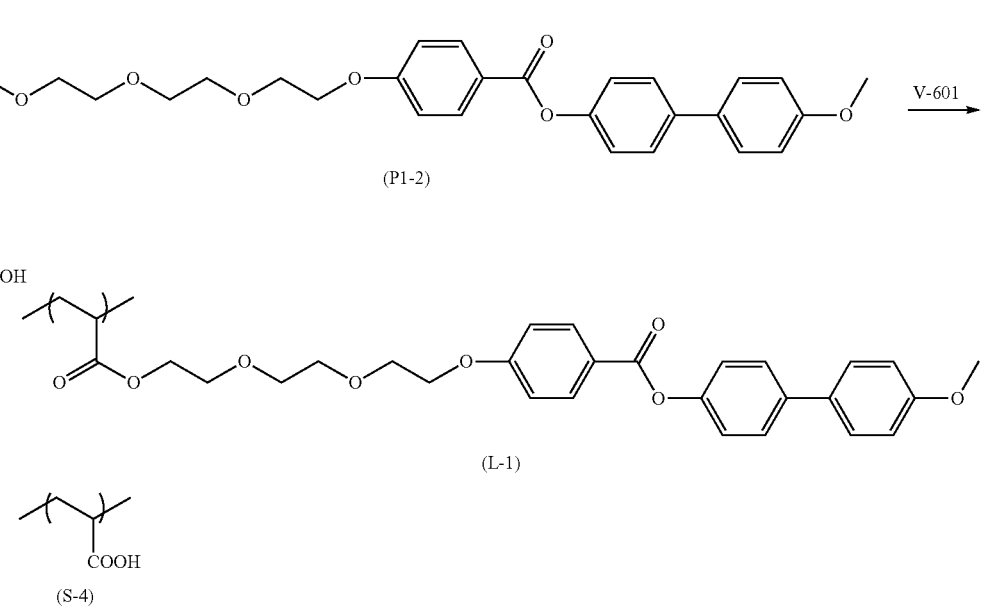

A DMAc solution (3.3 mL) of the compound (P1-2) (0.98 g) and an acrylic acid (0.02 g) was heated to an internal temperature of 80° C. under a nitrogen stream. A DMAc solution (0.5 mL) of 2,2'-azobis(2-methylpropionic acid) dimethyl (0.54 mmol, 0.12 g) (trade name "V-601", manufactured by FUJIFILM Wako Pure Chemical Corporation) was added thereto, and stirring was performed for 2 hours at 80° C. Thereafter, disappearance of the polymerizable group was confirmed by $^1$H-NMR spectrum measurement, and the solution was cooled to room temperature. Methanol was added for filtering, and the residues were washed with methanol to obtain 0.95 g of a copolymer as a white solid having a repeating unit (L-1) and a repeating unit (S-4). A weight-average molecular weight (Mw) of the obtained polymer was 12,000.

The molecular weight was calculated in terms of polystyrene by gel permeation chromatography (GPC) with the use of TSKgel SuperHZM-H, TSKgel SuperHZ4000, and TSKgel SuperHZ2000 (manufactured by Tosoh Corporation) as columns and N-methylpyrrolidone as a solvent.

(Synthesis of Copolymer (Polymer Liquid Crystalline Compound) Having Repeating Unit (L-1) And Repeating Unit (S-6))

A DMAc solution (3.3 mL) of the compound (P1-2) (0.96 g) and 2-hydroxyethyl acrylate (0.04 g) was heated to an internal temperature of 80° C. under a nitrogen stream. A DMAc solution (0.5 mL) of 2,2'-azobis(2-methylpropionic acid)dimethyl (0.54 mmol, 0.12 g) (trade name "V-601", manufactured by FUJIFILM Wako Pure Chemical Corporation) was added thereto, and stirring was performed for 2 hours at 80° C. Thereafter, disappearance of the polymerizable group was confirmed by $^1$H-NMR spectrum measurement, and the solution was cooled to room temperature. Methanol was added for filtering, and the residues were washed with methanol to obtain 0.95 g of a copolymer as a white solid having a repeating unit (L-1) and a repeating unit (S-6-1). The obtained copolymer was made into a DMAc solution (7 mL), BHT (0.1 g) and acrylic acid chloride (0.5 ml) were added thereto, and the mixture was stirred for 3 hours. Then, methanol was added for filtering, and the residues were washed with methanol to obtain 0.90 g of a copolymer as a white solid having a repeating unit (L-1) and a repeating unit (S-6). A weight-average molecular weight (Mw) of the obtained polymer was 12,000.

The molecular weight was calculated in terms of polystyrene by gel permeation chromatography (GPC) with the

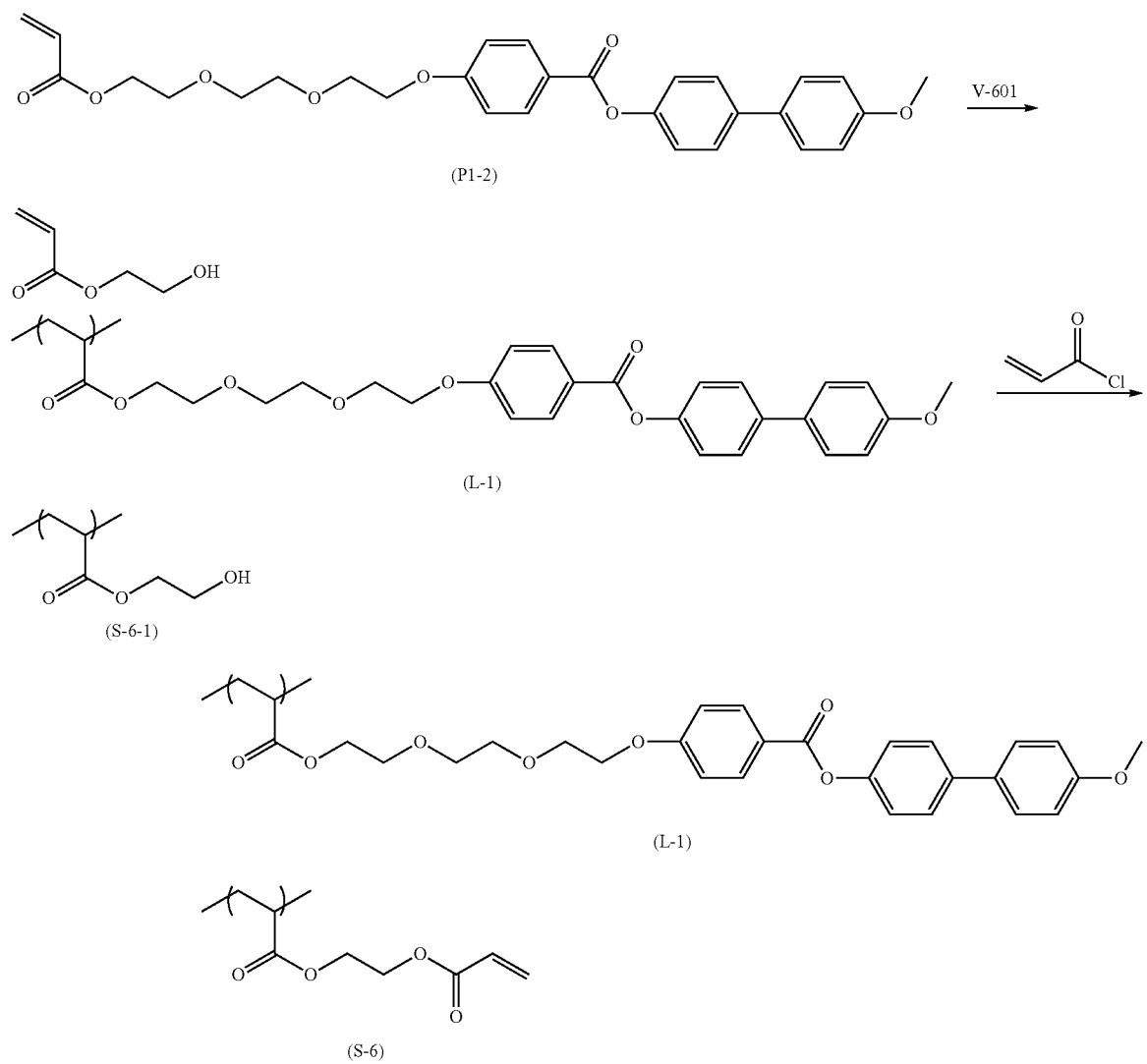

use of TSKgel Super HZM-H, TSKgel Super HZ4000, and TSKgel Super HZ2000 (manufactured by Tosoh Corporation) as columns and N-methylpyrrolidone as a solvent.

Among the polymer liquid crystalline compounds used in the examples and comparative examples to be described later, polymer liquid crystalline compounds other than the polymer liquid crystalline compounds synthesized as described above were synthesized with reference to the synthesis method described above.

Example 1-1

<Production of Alignment Film>

A glass base material (manufactured by Central Glass Co., Ltd., blue plate glass, size: 300 mm×300 mm, thickness: 1.1 mm) was washed with an alkaline detergent, and then pure water was poured thereto. After that, the glass base material was dried.

The following alignment film forming composition 1 was applied to the glass base material after the drying using a bar #12, and the applied alignment film forming composition 1 was dried for 2 minutes at 110° C. to form a coating film on the glass base material.

The obtained coating film was subjected to a rubbing treatment (rotation speed of roller: 1,000 rotations/2.9 mm of spacer thickness, stage speed: 1.8 m/min) once to produce an alignment film 1 on the glass base material.

| Composition of Alignment Film Forming Composition 1 | |
|---|---|
| Modified Vinyl Alcohol (see Formula (PVA-1)) | 2.00 parts by mass |
| Water | 74.08 parts by mass |
| Methanol | 23.86 parts by mass |
| Photopolymerization Initiator (IRGACURE 2959, manufactured by BASF SE) | 0.06 parts by mass |

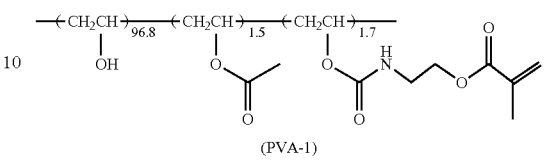

(PVA-1)

<Production of Light Absorption Anisotropic Film>

The obtained alignment film 1 was spin-coated with the following liquid crystal composition 1 at 1,000 rpm to form a coating film.

The coating film was dried at room temperature for 30 seconds, and then heated at 150° C. for 60 seconds.

Next, the coating film was cooled to room temperature, and then irradiated with light under an irradiation condition of an illuminance of 28 mW/cm$^2$ at 80° C. using a high-pressure mercury lamp to produce a light absorption anisotropic film 1 on the alignment film 1.

Two types of dichroic substances were used in the liquid crystal composition 1, and the content of the dichroic substances in the total solid content of the liquid crystal composition 1 was 10% by mass.

| Composition of Liquid Crystal Composition 1 | |
|---|---|
| (Content of Dichroic Substances in Total Solid Content: 10% by mass) | |
| Polymer Liquid Crystalline Compound Described in Example 1-1 of Table 1 (Repeating Unit (1):Repeating Unit (2) = 96:4 (mass basis)) | 7.18 parts by mass |
| Following Dichroic Substance D1 | 0.35 parts by mass |
| Following Dichroic Substance D2 | 0.45 parts by mass |
| Polymerization Initiator Irg-819 (manufactured by BASF SE) | 0.04 parts by mass |
| Following Interface Improver F1 | 0.01 parts by mass |
| Chloroform | 91.96 parts by mass |

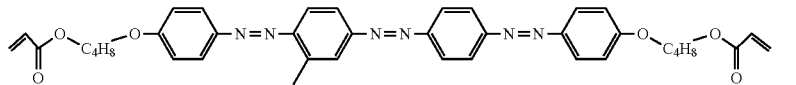

D1

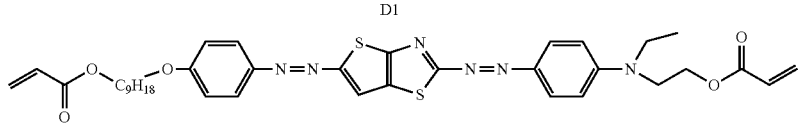

D2

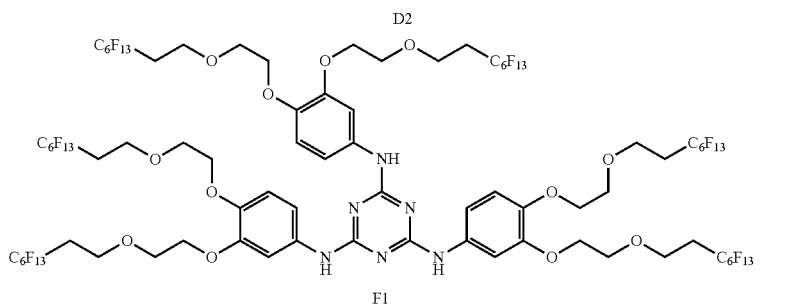

F1

Examples 1-2 to 1-8 and Comparative Examples 1-1 to 1-5

A light absorption anisotropic film was formed on the alignment film 1 in the same manner as in Example 1-1, except that the type or content of the polymer liquid crystalline compound in the liquid crystal composition was changed as shown in the following Table 1.

[Evaluation Tests]

<Alignment Degree>

In a state in which a linear polarizer was inserted on the light source side of an optical microscope (manufactured by Nikon Corporation, product name "ECLIPSE E600 POL"), the light absorption anisotropic film of each of the examples and the comparative examples was set on a sample table, and using a multi-channel spectroscope (manufactured by Ocean Optics, Inc., product name "QE65000"), an absorbance of the light absorption anisotropic film in a wavelength region described in Table 1 was measured to calculate an alignment degree by the following formula.

Alignment Degree: S=[(Az0/Ay0)−1]/[(Az0/Ay0)+2]

Az0: absorbance of light absorption anisotropic film with respect to polarization in absorption axis direction.

Ay0: absorbance of light absorption anisotropic film with respect to polarization in polarization axis direction.

<Evaluation of Alignment Degree>

The alignment degree was evaluated as follows based on the alignment degree of a comparative example (hereinafter, also referred to as "reference comparative example") containing a polymer liquid crystalline compound which was a homopolymer formed only of the same type of repeating unit (1) and had the same dichroic substance content.

A: The alignment degree is equal to or greater than that of the reference comparative example using the homopolymer formed only of the repeating unit (1).

B: The alignment degree is 0.01 or more lower than that of the reference comparative example using the homopolymer formed only of the repeating unit (1).

C: The alignment degree is 0.02 or more lower than that of the reference comparative example using the homopolymer formed only of the repeating unit (1).

<Evaluation of Solubility (Solubility of Polymer Liquid Crystalline Compound)>

A polymer liquid crystalline compound was added to a mixed solvent of tetrahydrofuran (THF) and cyclopentanone (CPO) (THF:CPO (volume ratio)=70:30) at a predetermined concentration (% by mass), and then dissolved by stirring at 45° C. for 10 minutes to make the mixture transparent. After leaving at room temperature for 1 day, the concentration (% by mass) of the polymer liquid crystalline compound which remained transparent was measured.

<Evaluation Results>

The results of the above evaluation tests of Examples 1-1 to 1-8 and Comparative Examples 1-1 to 1-5 are shown in Table 1 below.

Structural formulae corresponding to the types of the repeating units (1) and (2) in Table 1 and table to be described later are collectively shown below.

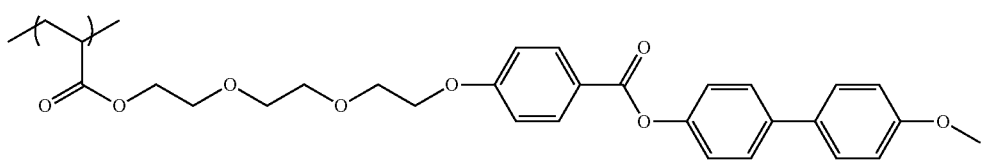
(L-1)

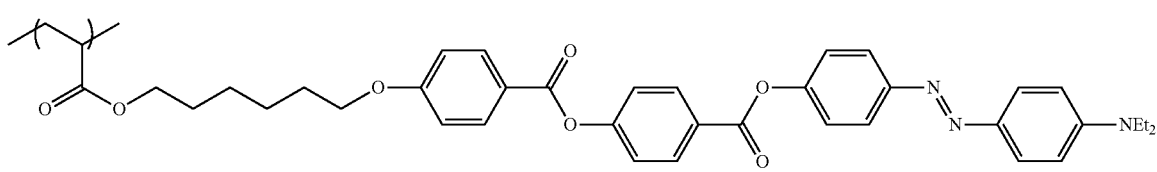
(L-2)

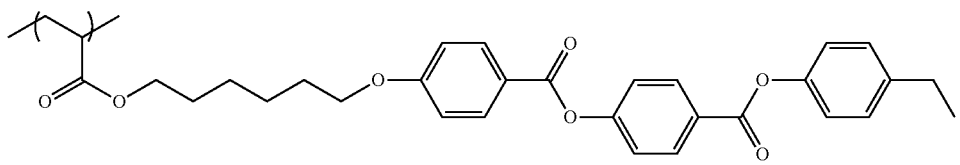
(L-3)

In the formula, "Et" represents an ethyl group.

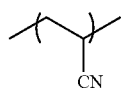
(S-2)

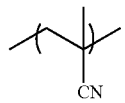
(S-3)

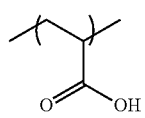
(S-4)

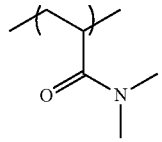
(S-5)

-continued

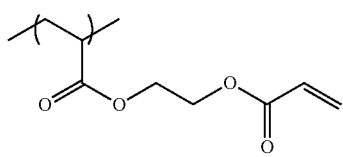
(S-6)

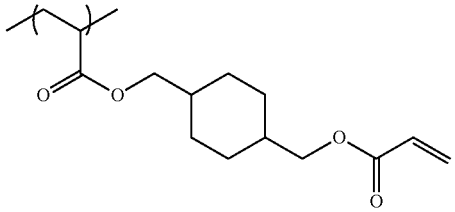
(S-11)

(S-8)

(S-13)

(S-9)

(S-14)

(S-10)

(S-15)

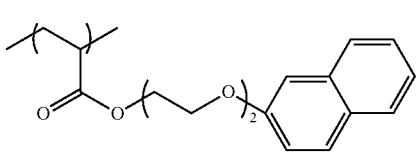

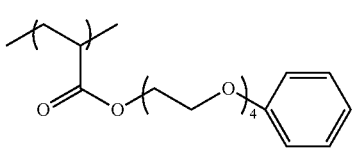

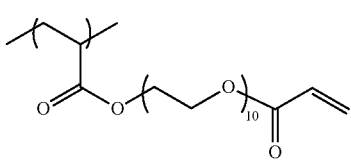

TABLE 1

| | Polymer Liquid Crystalline Compound | | | | Dichroic Substance | Evaluation Test | | |
|---|---|---|---|---|---|---|---|---|
| | Repeating Unit (1) | | Repeating Unit (2) | | Copolymerization Ratio (% by mass) | Content in Total | Alignment Degree | |
| | Kind | Molecular Weight | Kind | Molecular Weight | Repeating Unit (1) | Repeating Unit (2) | Solid Content (% by mass) | Value | Evaluation Result | Solubility |
| Example 1-1 | L-1 | 507 | S-3 | 67 | 96 | 4 | 10 | 0.93 | A | 15% |
| Example 1-2 | L-1 | 507 | S-4 | 72 | 98 | 2 | 10 | 0.93 | A | 10% |
| Example 1-3 | L-1 | 507 | S-5 | 93 | 96 | 4 | 10 | 0.93 | A | 15% |
| Example 1-4 | L-1 | 507 | S-6 | 170 | 96 | 4 | 10 | 0.93 | A | 15% |
| Example 1-5 | L-1 | 507 | S-8 | 214 | 96 | 4 | 10 | 0.93 | A | 10% |
| Example 1-6 | L-1 | 507 | S-9 | 184 | 96 | 4 | 10 | 0.93 | A | 10% |
| Example 1-7 | L-1 | 507 | S-11 | 252 | 96 | 4 | 10 | 0.93 | A | 10% |
| Example 1-8 | L-I | 507 | S-8 | 214 | 93 | 7 | 10 | 0.93 | A | 15% |
| Comparative Example 1-1 | L-1 | 507 | — | — | 100 | — | 10 | 0.93 | — | <5% |
| Comparative Example 1-2 | L-1 | 507 | S-13 | 286 | 96 | 4 | 10 | 0.92 | B | 5% |
| Comparative Example 1-3 | L-1 | 507 | S-15 | 512 | 96 | 4 | 10 | 0.92 | B | 5% |
| Comparative Example 1-4 | L-1 | 507 | S-14 | 324 | 93 | 7 | 10 | 0.91 | C | 10% |
| Comparative Example 1-5 | L-1 | 507 | S-8 | 214 | 86 | 14 | 10 | 0.85 | C | 20% |

As shown in the results of the evaluation tests of Table 1, it has been found that in a case where a polymer liquid crystalline compound having the repeating unit (2) with a molecular weight of 280 or less is used (Examples 1-1 to 1-8), an excellent alignment degree is obtained as in Comparative Example 1-1 using a polymer liquid crystalline compound which is a homopolymer of the repeating unit (1), and the solubility of the polymer liquid crystalline compound is more excellent than Comparative Example 1-1.

It has been found that in a case where the repeating unit (2) with a molecular weight of greater than 280 is contained (Comparative Examples 1-2 to 1-4), or a polymer liquid crystalline compound containing 14% by mass of the repeating unit (2) is used (Comparative Example 1-5), the alignment degree of a light absorption anisotropic film to be obtained is reduced.

Example 2-1

A light absorption anisotropic film was formed on the alignment film 1 in the same manner as in Example 1-1, except that the following liquid crystal composition 2 was used instead of the liquid crystal composition 1.

Two types of dichroic substances were used in the liquid crystal composition 2, and the content of the dichroic substances in the total solid content of the liquid crystal composition 2 was 4% by mass.

| Composition of Liquid Crystal Composition 2 | |
| --- | --- |
| (Content of Dichroic Substances in Total Solid Content: 4% by mass) | |
| Polymer Liquid Crystalline Compound Described in Example 2-1 of Table 2 (Repeating Unit (1):Repeating Unit (2) = 96:4 (mass basis)) | 7.67 parts by mass |
| Above Dichroic Substance D1 | 0.14 parts by mass |
| Above Dichroic Substance D2 | 0.18 parts by mass |
| Polymerization Initiator Irg-819 (manufactured by BASF SE) | 0.04 parts by mass |
| Above Interface Improver F1 | 0.01 parts by mass |
| Chloroform | 91.95 parts by mass |

Examples 2-2 and Comparative Examples 2-1 and 2-2

A light absorption anisotropic film was formed on the alignment film 1 in the same manner as in Example 2-1, except that the type or content of the polymer liquid crystalline compound in the liquid crystal composition was changed as shown in Table 2.

<Evaluation Results>

Regarding the solubility of the polymer liquid crystalline compounds used in Examples 2-1 and 2-2 and Comparative Examples 2-1 and 2-2, and the alignment degrees of the obtained light absorption anisotropic films, evaluation tests were performed in the same manner as in Example 1-1. The evaluation results are shown in Table 2 below.

TABLE 2

| | Polymer Liquid Crystalline Compound | | | | Copolymerization Ratio (% by mass) | | Dichroic Substance Content in Total | Evaluation Test | | |
| --- | --- | --- | --- | --- | --- | --- | --- | --- | --- | --- |
| | Repeating Unit (1) | | Repeating Unit (2) | | | | | Alignment Degree | | |
| | Kind | Molecular Weight | Kind | Molecular Weight | Repeating Unit (1) | Repeating Unit (2) | Solid Content (% by mass) | Value | Evaluation Result | Solubility |
| Example 2-1 | L-1 | 507 | S-6 | 170 | 98 | 2 | 4 | 0.92 | A | 10% |
| Example 2-2 | L-1 | 507 | S-10 | 192 | 96 | 4 | 4 | 0.92 | A | 10% |
| Comparative Example 2-1 | L-1 | 507 | — | — | 100 | — | 4 | 0.92 | — | <5% |
| Comparative Example 2-2 | L-1 | 507 | S-14 | 324 | 96 | 4 | 4 | 0.91 | B | 5% |

As shown in the results of the evaluation tests of Table 2, it has been found that in a case where a polymer liquid crystalline compound having the repeating unit (2) with a molecular weight of 280 or less is used (Examples 2-1 and 2-2), an excellent alignment degree is obtained as in Comparative Example 2-1 using a polymer liquid crystalline compound which is a homopolymer of the repeating unit (1), and the solubility of the polymer liquid crystalline compound is more excellent than Comparative Example 2-1.

It has been found that in a case where the repeating unit (2) with a molecular weight of greater than 280 is contained (Comparative Example 2-2), the alignment degree of a light absorption anisotropic film to be obtained and the solubility of the polymer liquid crystalline compound are reduced.

However, as shown in Table 2, in a case where the content of the dichroic substances in the total solid content of the liquid crystal composition was 4% by mass, there was a tendency that the alignment degree was lowered in comparison with a case where the content was greater than 4% by mass.

Example 3-1

A light absorption anisotropic film was formed on the alignment film 1 in the same manner as in Example 1-1, except that the following liquid crystal composition 3 was used instead of the liquid crystal composition 1.

Two types of dichroic substances were used in the liquid crystal composition 3, and the content of the dichroic substances in the total solid content of the liquid crystal composition 3 was 14% by mass.

| Composition of Liquid Crystal Composition 3 | |
| --- | --- |
| (Content of Dichroic Substances in Total Solid Content: 14% by mass) | |
| Polymer Liquid Crystalline Compound Described in Example 3-1 of Table 3 | 6.89 parts by mass |

-continued

| Composition of Liquid Crystal Composition 3 | |
|---|---|
| (Repeating Unit (1):Repeating Unit (2) = 96:4 (mass basis)) | |
| Above Dichroic Substance D1 | 0.48 parts by mass |
| Above Dichroic Substance D2 | 0.62 parts by mass |
| Polymerization Initiator Irg-819 (manufactured by BASF SE) | 0.03 parts by mass |
| Above Interface Improver F1 | 0.01 parts by mass |
| Chloroform | 91.96 parts by mass |

Examples 3-2 and Comparative Examples 3-1 and 3-2

A light absorption anisotropic film was formed on the alignment film 1 in the same manner as in Example 3-1, except that the type or content of the polymer liquid crystalline compound in the liquid crystal composition was changed as shown in Table 3.

<Evaluation Results>

Regarding the solubility of the polymer liquid crystalline compounds used in Examples 3-1 and 3-2 and Comparative Examples 3-1 and 3-2, and the alignment degrees of the obtained light absorption anisotropic films, evaluation tests were performed in the same manner as in Example 1-1. The evaluation results are shown in Table 3 below.

Comparative Example 4-1

A light absorption anisotropic film was formed on the alignment film 1 in the same manner as in Example 1-1, except that the following liquid crystal composition 4 was used instead of the liquid crystal composition 1.

Two types of dichroic substances were used in the liquid crystal composition 4, and the content of the dichroic substances in the total solid content of the liquid crystal composition 4 was 2% by mass.

| Composition of Liquid Crystal Composition 4 | |
|---|---|
| (Content of Dichroic Substances in Total Solid Content: 2% by mass) | |
| Polymer Liquid Crystalline Compound Described in Example 4-1 of Table 4 (Repeating Unit (1):Repeating Unit (2) = 96:4 (mass basis)) | 7.83 parts by mass |
| Above Dichroic Substance D1 | 0.07 parts by mass |
| Above Dichroic Substance D2 | 0.09 parts by mass |
| Polymerization Initiator Irg-819 (manufactured by BASF SE) | 0.04 parts by mass |
| Above Interface Improver F1 | 0.01 parts by mass |
| Chloroform | 91.95 parts by mass |

TABLE 3

| | Polymer Liquid Crystalline Compound | | | | | Dichroic Substance | Evaluation Test | | |
|---|---|---|---|---|---|---|---|---|---|
| | Repeating Unit (1) | | Repeating Unit (2) | | Copolymerization Ratio (% by mass) | Content in Total | Alignment Degree | | |
| | Kind | Molecular Weight | Kind | Molecular Weight | Repeating Unit (1) | Repeating Unit (2) | Solid Content (% by mass) | Value | Evaluation Result | Solubility |
| Example 3-1 | L-1 | 507 | S-2 | 53 | 96 | 4 | 14 | 0.94 | A | 15% |
| Example 3-2 | L-1 | 507 | S-6 | 170 | 96 | 4 | 14 | 0.94 | A | 15% |
| Comparative Example 3-1 | L-1 | 507 | — | — | 100 | — | 14 | 0.94 | — | <5% |
| Comparative Example 3-2 | L-1 | 507 | S-14 | 324 | 96 | 4 | 14 | 0.92 | C | 10% |

As shown in the results of the evaluation tests of Table 3, it has been found that in a case where a polymer liquid crystalline compound having the repeating unit (2) with a molecular weight of 280 or less is used (Examples 3-1 and 3-2), an excellent alignment degree is obtained as in Comparative Example 3-1 using a polymer liquid crystalline compound which is a homopolymer of the repeating unit (1), and the solubility of the polymer liquid crystalline compound is more excellent than Comparative Example 3-1.

It has been found that in a case where the repeating unit (2) with a molecular weight of greater than 280 is contained (Comparative Example 3-2), the alignment degree of a light absorption anisotropic film to be obtained is reduced.

In addition, as shown in Table 3, in a case where the content of the dichroic substances in the total solid content of the liquid crystal composition was 14% by mass, there was a tendency that the alignment degree was increased in comparison with a case where the content was less than 14% by mass.

Comparative Examples 4-2 to 4-4

A light absorption anisotropic film was formed on the alignment film 1 in the same manner as in Comparative Example 4-1, except that the type or content of the polymer liquid crystalline compound in the liquid crystal composition was changed as shown in Table 4.

<Evaluation Results>

Regarding the solubility of the polymer liquid crystalline compounds used in Comparative Examples 4-1 to 4-4, and the alignment degrees of the obtained light absorption anisotropic films, evaluation tests were performed in the same manner as in Example 1-1. The evaluation results are shown in Table 4 below.

TABLE 4

| | Polymer Liquid Crystalline Compound | | | | | Dichroic Substance | Evaluation Test | | |
|---|---|---|---|---|---|---|---|---|---|
| | Repeating Unit (1) | | Repeating Unit (2) | | Copolymerization Ratio (% by mass) | Content in Total | Alignment Degree | | |
| | Kind | Molecular Weight | Kind | Molecular Weight | Repeating Unit (1) | Repeating Unit (2) | Solid Content (% by mass) | Value | Evaluation Result | Solubility |
| Comparative Example 4-1 | L-1 | 507 | S-6 | 170 | 96 | 4 | 2 | 0.90 | B | 15% |
| Comparative Example 4-2 | L-1 | 507 | S-10 | 192 | 96 | 4 | 2 | 0.90 | B | 10% |
| Comparative Example 4-3 | L-1 | 507 | — | — | 100 | — | 2 | 0.91 | — | <5% |
| Comparative Example 4-4 | L-1 | 507 | S-14 | 324 | 96 | 4 | 2 | 0.90 | B | 5% |

As shown in Table 4, it has been found that in a case where the content of the dichroic substances in the total solid content of the liquid crystal composition is 2% by mass, and a polymer liquid crystal compound having the repeating unit (2) with a molecular weight of 280 or less is used (Comparative Examples 4-1 and 4-2), the solubility of the polymer liquid crystalline compound is excellent, but the alignment degree is lowered in comparison with Comparative Example 4-1 using a polymer liquid crystalline compound which is a homopolymer of the repeating unit (1).

Example 5-1

A light absorption anisotropic film was formed on the alignment film 1 in the same manner as in Example 1-1, except that the following liquid crystal composition 5 was used instead of the liquid crystal composition 1.

Two types of dichroic substances were used in the liquid crystal composition 5, and the content of the dichroic substances in the total solid content of the liquid crystal composition 5 was 10% by mass.

In Formula (D3), "Me" represents a methyl group.

Examples 5-2 and Comparative Examples 5-1 and 5-2

A light absorption anisotropic film was formed on the alignment film 1 in the same manner as in Example 5-1, except that the type or content of the polymer liquid crystalline compound in the liquid crystal composition was changed as shown in Table 5.

<Evaluation Results>

Regarding the solubility of the polymer liquid crystalline compounds used in Examples 5-1 and 5-2 and Comparative Examples 5-1 and 5-2, and the alignment degrees of the obtained light absorption anisotropic films, evaluation tests were performed in the same manner as in Example 1-1. The evaluation results are shown in Table 5 below.

| Composition of Liquid Crystal Composition 5 | |
|---|---|
| (Content of Dichroic Substances in Total Solid Content: 10% by mass) | |
| Polymer Liquid Crystalline Compound Described in Example 5-1 of Table 5 (Repeating Unit (1):Repeating Unit (2) = 96:4 (mass basis)) | 7.18 parts by mass |
| Following Dichroic Substance D3 | 0.35 parts by mass |
| Following Dichroic Substance D4 | 0.45 parts by mass |
| Polymerization Initiator Irg-819 (manufactured by BASF SE) | 0.04 parts by mass |
| Above Interface Improver F1 | 0.01 parts by mass |
| Chloroform | 91.95 parts by mass |

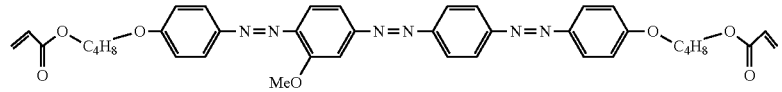

D3

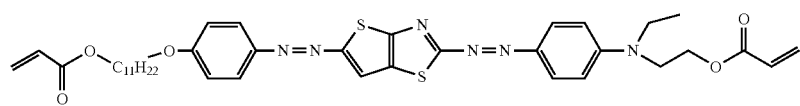

D4

TABLE 5

| | Polymer Liquid Crystalline Compound | | | | | | Dichroic Substance | Evaluation Test | | |
| --- | --- | --- | --- | --- | --- | --- | --- | --- | --- | --- |
| | Repeating Unit (1) | | Repeating Unit (2) | | Copolymerization Ratio (% by mass) | | Content in Total | Alignment Degree | | |
| | Kind | Molecular Weight | Kind | Molecular Weight | Repeating Unit (1) | Repeating Unit (2) | Solid Content (% by mass) | Value | Evaluation Result | Solubility |
| Example 5-1 | L-1 | 507 | S-4 | 72 | 96 | 4 | 10 | 0.92 | A | 15% |
| Example 5-2 | L-1 | 507 | S-6 | 170 | 96 | 4 | 10 | 0.92 | A | 15% |
| Comparative Example 5-1 | L-1 | 507 | — | — | 100 | — | 10 | 0.92 | — | <5% |
| Comparative Example 5-2 | L-1 | 507 | S-13 | 286 | 96 | 4 | 10 | 0.90 | C | 5% |

As shown in the results of the evaluation tests of Table 5, it has been found that in a case where a polymer liquid crystalline compound having the repeating unit (2) with a molecular weight of 280 or less is used (Examples 5-1 and 5-2), an excellent alignment degree is obtained as in Comparative Example 5-1 using a polymer liquid crystalline compound which is a homopolymer of the repeating unit (1), and the solubility of the polymer liquid crystalline compound is more excellent than Comparative Example 5-1 regardless of the type of the dichroic substance.

It has been found that in a case where the repeating unit (2) with a molecular weight of greater than 280 is contained (Comparative Example 5-2), the alignment degree of a light absorption anisotropic film to be obtained and the solubility of the polymer liquid crystalline compound are reduced.

Example 6-1

A light absorption anisotropic film was formed on the alignment film 1 in the same manner as in Example 1-1, except that the following liquid crystal composition 6 was used instead of the liquid crystal composition 1.

Two types of dichroic substances were used in the liquid crystal composition 6, and the content of the dichroic substances in the total solid content of the liquid crystal composition 6 was 30% by mass.

Composition of Liquid Crystal Composition 6

(Content of Dichroic Substances in Total Solid Content: 30% by mass)

| | |
| --- | --- |
| Polymer Liquid Crystalline Compound Described in Example 6-1 of Table 6 | 3.92 parts by mass |

-continued

Composition of Liquid Crystal Composition 6

(Repeating Unit (1):Repeating Unit (2) = 96:4 (mass basis))

| | |
| --- | --- |
| Above Dichroic Substance D1 | 0.78 parts by mass |
| Above Dichroic Substance D2 | 1.03 parts by mass |
| Polymerization Initiator Irg-819 (manufactured by BASF SE) | 0.04 parts by mass |
| Above Interface Improver F1 | 0.02 parts by mass |
| Chloroform | 108.92 parts by mass |

Examples 6-2 and Comparative Examples 6-1 and 6-2

A light absorption anisotropic film was formed on the alignment film 1 in the same manner as in Example 6-1, except that the type or content of the polymer liquid crystalline compound in the liquid crystal composition was changed as shown in Table 6.

<Evaluation Results>

Regarding the solubility of the polymer liquid crystalline compounds used in Examples 6-1 and 6-2 and Comparative Examples 6-1 and 6-2, and the alignment degrees of the obtained light absorption anisotropic films, evaluation tests were performed in the same manner as in Example 1-1. The evaluation results are shown in Table 6 below.

TABLE 6

| | Polymer Liquid Crystalline Compound | | | | | | Dichroic Substance | Evaluation Test | | |
| --- | --- | --- | --- | --- | --- | --- | --- | --- | --- | --- |
| | Repeating Unit (1) | | Repeating Unit (2) | | Copolymerization Ratio (% by mass) | | Content in Total | Alignment Degree | | |
| | Kind | Molecular Weight | Kind | Molecular Weight | Repeating Unit (1) | Repeating Unit (2) | Solid Content (% by mass) | Value | Evaluation Result | Solubility |
| Example 6-1 | L-2 | 664 | S-4 | 72 | 96 | 4 | 30 | 0.82 | A | 15% |
| Example 6-2 | L-3 | 517 | S-6 | 170 | 90 | 10 | 30 | 0.85 | A | 20% |
| Comparative Example 6-1 | L-2 | 664 | — | — | 100 | — | 30 | 0.81 | — | 10% |
| Comparative Example 6-2 | L-3 | 517 | — | — | 100 | — | 30 | 0.84 | — | 10% |

As shown in the results of the evaluation tests of Table 6, it has been found that in a case where a polymer liquid crystalline compound having the repeating unit (2) with a molecular weight of 280 or less is used (Examples 6-1 and 6-2), a more excellent alignment degree is obtained than in Comparative Examples 6-1 and 6-2 using a polymer liquid crystalline compound which is a homopolymer of the repeating unit (1), and the solubility of the polymer liquid crystalline compound is more excellent than Comparative Examples 6-1 and 6-2.

What is claimed is:

1. A liquid crystal composition comprising:
a side chain polymer liquid crystalline compound; and
a dichroic substance,
wherein the side chain polymer liquid crystalline compound is a copolymer having a repeating unit (1) containing a mesogenic group with a molecular weight of greater than 280 and a repeating unit (2) with a molecular weight of 280 or less, a content of the repeating unit (2) is less than 14% by mass with respect to a total mass of the side chain polymer liquid crystalline compound, a content of the dichroic substance is greater than 2% by mass and less than 30% by mass with respect to a total solid content of the liquid crystal composition, and
the repeating unit (2) is a repeating unit represented by Formula (2),

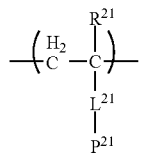

(2)

in Formula (2), $R^{21}$ represents a hydrogen atom or an alkyl group having 1 to 4 carbon atoms, $L^{21}$ represents a single bond or a divalent linking group, $P^{21}$ represents a monovalent group containing an acryloyl group, a methacryloyl group, a maleimide group, a styryl group, or a 1-cyclopentene-3,5-dione group.

2. The liquid crystal composition according to claim 1, wherein the repeating unit (1) is represented by Formula (1),

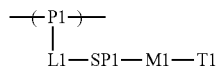

(1)

in Formula (1), P1 represents a main chain of the repeating unit, L1 represents a single bond or a divalent linking group, SP1 represents a single bond or a spacer group, M1 represents a mesogenic group, and T1 represents a terminal group.

3. The liquid crystal composition according to claim 1, wherein the content of the dichroic substance is 4% by mass or greater and less than 30% by mass with respect to the total solid content of the liquid crystal composition.

4. The liquid crystal composition according to claim 1, wherein the content of the dichroic substance is 10% by mass or greater and less than 30% by mass with respect to the total solid content of the liquid crystal composition.

5. The liquid crystal composition according to claim 1, wherein a molecular weight of the repeating unit (2) is 180 or less.

6. The liquid crystal composition according to claim 1, wherein the content of the repeating unit (2) is 2% to 7% by mass with respect to the total mass of the side chain polymer liquid crystalline compound.

7. The liquid crystal composition according to claim 1, wherein the repeating unit (2) contains no mesogenic group.

8. The liquid crystal composition according to claim 2, wherein the content of the dichroic substance is 4% by mass or greater with respect to the total solid content of the liquid crystal composition.

9. The liquid crystal composition according to claim 2, wherein the content of the dichroic substance is 10% by mass or greater with respect to the total solid content of the liquid crystal composition.

10. The liquid crystal composition according to claim 3, wherein the content of the dichroic substance is 10% by mass or greater with respect to the total solid content of the liquid crystal composition.

11. The liquid crystal composition according to claim 2, wherein a molecular weight of the repeating unit (2) is 180 or less.

12. The liquid crystal composition according to claim 3, wherein a molecular weight of the repeating unit (2) is 180 or less.

13. The liquid crystal composition according to claim 4, wherein a molecular weight of the repeating unit (2) is 180 or less.

14. The liquid crystal composition according to claim 2, wherein the content of the repeating unit (2) is 2% to 7% by mass with respect to the total mass of the side chain polymer liquid crystalline compound.

15. The liquid crystal composition according to claim 3, wherein the content of the repeating unit (2) is 2% to 7% by mass with respect to the total mass of the side chain polymer liquid crystalline compound.

16. The liquid crystal composition according to claim 4, wherein the content of the repeating unit (2) is 2% to 7% by mass with respect to the total mass of the side chain polymer liquid crystalline compound.

17. A light absorption anisotropic film comprising a cured product of the liquid crystal composition according to claim 4.

18. A laminate comprising:
a base material; and
the light absorption anisotropic film according to claim 17, which is provided on the base material.

19. The laminate according to claim 18, further comprising:
a λ/4 plate which is provided on the light absorption anisotropic film.

20. An image display device comprising:
the light absorption anisotropic film according to claim 17.

* * * * *